(12) United States Patent
Hamilton et al.

(10) Patent No.: US 6,392,993 B1
(45) Date of Patent: *May 21, 2002

(54) METHOD AND COMPUTER PROGRAM PRODUCT FOR EFFICIENTLY AND RELIABLY SENDING SMALL DATA MESSAGES FROM A SENDING SYSTEM TO A LARGE NUMBER OF RECEIVING SYSTEMS

(75) Inventors: Keith S. Hamilton, Redmond; Robert Steven Meizlik, Newcastle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/106,403

(22) Filed: Jun. 29, 1998

(51) Int. Cl.$^7$ .................................................. H04J 3/26
(52) U.S. Cl. ........................ 370/230; 370/474; 714/748
(58) Field of Search ................................ 370/229–232, 370/235, 236, 390, 474; 714/748, 749

(56) References Cited

U.S. PATENT DOCUMENTS 5,627,970 A * 5/1997 Keshav .................. 395/200.13
6,097,697 A * 8/2000 Yao et al. .................... 370/230
6,112,323 A * 8/2000 Meizlik et al. ............. 714/748

OTHER PUBLICATIONS

RFC 768; J. Postel; ISI; Aug. 28, 1980; User Datagram Header Format; (pp. 1–3).

(List continued on next page.)

Primary Examiner—Melvin Marcelo
(74) Attorney, Agent, or Firm—Workman, Nydegger, Seeley

(57) ABSTRACT

In a network with a sending system networked to at least one receiving system, it is sometimes desirable to transfer relatively short messages between the sending system and one or more receiving systems in a highly reliable yet highly efficient manner. The present invention defines two short message protocols, one of which relies on a statistical model and the other of which uses positive acknowledgement to track receipt of transmitted packets by intended recipient. The statistical reliability mode is based on the observation that for each packet in a message that is transmitted, the probability that at least one packet of the message is received by a given system increases. Thus, in the statistical reliability mode messages are divided into a guaranteed minimum number of packets, with additional packets being added if the message length is insufficient to fill the minimum number of packets. The positive reliability mode of the present invention periodically sets an acknowledgement flag in the packets transmitted for a message. Receiving systems send an acknowledgement in response to receipt of that packet. The sending system tracks receipt of acknowledgements by intended recipient and retransmits any unacknowledged packets so as to positively assure the packets are received. Receiving systems send negative acknowledgements to request retransmission of missing packets. Negative acknowledgement suppression is implemented at both the sender and receiver to prevent a flood of negative acknowledgements from overwhelming the network. Packets are transmitted by the sending system at a transmission rate selected to avoid any adverse impact on the packet loss rate of the network.

29 Claims, 13 Drawing Sheets

OTHER PUBLICATIONS

RFC 792; Message Formats; Sep. 1981.

RFC 1112; Deering, S.; *Host Extensions for IP Multicasting*; (pp. 1–16); Stanford University; Aug. 1989.

RFC 1122; Postel. J; Network Working Group—Internet Control Message Protocol:*DARPA Internet Program Protocol Specification*; Sep. 1981, (pp. 1–43).

Chapter 3: *Specification*; Jan. 1980; Internet Protocol; (pp. 11–41).

Muuss, Mike; Code derived from Software Contributed to Berkeley by Mike Muuss; The Regents of the University of California; Copyright © 1989, 1993 (pp. 1–37).

* cited by examiner

METHOD AND COMPUTER PROGRAM PRODUCT FOR EFFICIENTLY AND RELIABLY SENDING SMALL DATA MESSAGES FROM A SENDING SYSTEM TO A LARGE NUMBER OF RECEIVING SYSTEMS

RELATED APPLICATIONS

This application is related to U.S. patent application Ser. No. 09/106,531, entitled "Method and Computer Program Product for Efficiently and Reliably Sending Small Data Messages From a Sending System to a Large Number of Receiving Systems," filed in the names of Keith Hamilton and Robert Meizlik now U.S. Pat. No. 6,112,323, and to U.S. patent application Ser. No. 09/106,400, entitled "Method and Computer Program Product for Efficiently and Reliably Sending Small Data Messages From a Sending System to a Large Number of Receiving Systems," filed in the names of Keith Hamilton and Robert Meizlik, both of which were filed on the same date as the present application.

BACKGROUND OF THE INVENTION

1. The Field of the Invention

The field of the present invention relates to small data message transmission from a sending system to a plurality of networked receiving systems. Such data communication is useful for centrally monitoring and controlling systems simultaneously. More particularly, the present invention deals with techniques for reliably making the transmission while simultaneously reducing the network traffic associated with such reliability.

2. The Prior State of the Art

In large scale networks, it is sometimes desirable to be able to quickly broadcast short messages containing relatively few packets to the network and to ensure that every system on the network receives the message with either an absolute certainty or with a very high probability. A sending system can send the message to a number of receiving systems. This capability can be used for a wide variety of purposes including centralized control of applications residing on the receiving systems. Inasmuch as it is possible to reliably transmit relatively short messages, a large, loosely coupled network can have centralized control attributes similar to those characteristics of mainframe systems.

One way to ensure reliability is to communicate with each and every receiving system using a connection based protocol, such as TCP over an IP network. In a connection based protocol, one system forms a connection to another system, transacts all communication with that system, and terminates the connection. If communication with multiple systems is desired, a connection is formed with each system, in turn. The overhead associated with creating and managing a connection between a sending system and a number of receiving systems is prohibitively expensive when there are a large number of receiving systems.

In order to reduce the overhead associated with connection based protocols, connectionless protocols, such as UDP over an IP network, have been developed. Connectionless protocols typically rely on a broadcast or "multicast" model where a single message is broadcast to a multiple receiving systems without forming a connection with the individual systems. This approach eliminates the overhead associated with forming connections with each system, but suffers from the inability to guarantee receipt of messages to all systems. For IP networks, multicast is unreliable by design in order to reduce overhead of sending packets to multiple destinations.

Other messaging protocols have been developed to address the problem of high reliability in the context of large messages consisting of hundred of thousands or millions of packets, but not for short messages of relatively fewer packets. Such protocols send data from a sending system to multiple receiving systems connected in an IP network using IP multicast that reduces sending overhead. When trying to address the inherent unreliability of IP multicast, current solutions may focus on high reliability for relatively few destinations as would occur in video conferencing or dynamic whiteboard application or may focus on many destinations for large data sets, such as streaming audio or video data, where dropping some packets is not viewed as a serious problem. These solutions to the inherent unreliability of IP multicast do not address the needs for highly reliable short message communications between a sending system and a plurality of receiving systems. Furthermore, such protocols usually do not scale well to very large networks because they create large floods of acknowledgments (ACKs) for positively assuring receipt and negative acknowledgments (NAKs) for causing retransmission of missing packets. In large scale networks this flood of ACKs and NAKs can totally choke the network.

Finally, prior protocols do not tightly couple the multicast of an original message with any replies that may be received. Again, this is due to the problems that were being solved, namely, that of reliably sending data out unidirectionally without expecting replies rather than having bidirectional communications as would occur in controlling distributed applications.

What would represent an advancement in the art would be a way of sending short data messages from a sending system to a plurality of receiving systems that reduces the network traffic normally associated with currently available solutions using efficient connectionless data transfer mechanisms, such as UDP multicast over IP networks. It would be a further advancement for such a method to further strongly couple response messages from each receiving system to the sending system in order to provide a bi-directional communication path.

SUMMARY AND OBJECTS OF THE INVENTION

It is an object of the present invention to reduce the amount of network traffic associated with reliably sending a small data message from a sending system to a number of receiving systems.

It is another object of the present invention to utilize negative suppression at both the sending system and at each receiving system to reduce network traffic.

For one aspect of the present invention, small messages are reliably sent on a statistically reliable basis so that the sending system is reasonably assured that all or almost all receiving systems have received the message while another aspect of the present invention positively assures that small messages were received by all the receiving systems.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a method and computer program product for efficiently and reliably transmitting data messages from a sending system to a number of receiving systems is provided.

To overcome the problems in the prior art, two protocols have been developed. The base protocol, generally referred to as Statistically Reliable Transmission or statistical reliability mode, relies on a probabilistic model that can be tuned to reduce the probability that any single system did not receive a message to an arbitrarily small number thus essentially ensuring that all systems receive a message. For those situations that the statistical model is insufficient and receipt must be guaranteed, minor modifications can be made to the protocol to produce a Positive Reliability Transmission protocol or positive reliability mode where systems that do not receive a message can be identified and steps can be taken to ensure they receive the message. Decisions on which mode to use can be made on a per message basis by an application, or on a per-sender or per-site basis by systems management.

Both protocols are based on UDP and both protocols multicast UDP packets to one or many recipients. The basic protocol relies on the transmission of multiple packets. Thus, when a message fills less than a specified minimum number of packets, the message is expanded to fill the required minimum number of packets. The packets are numbered so that a recipient can determine if the entire message has been received. The packets are sent to the intended recipients using a pacing algorithm that regulates the speed at which packets are sent. The pacing algorithm recognizes that the packet transmission rate generally influences the packet loss rate in the network. Pacing the packets prevents the packet transmission rate from adversely influencing the packet loss rate.

When the positive reliability transmission mode is used, an ACK requested flag is set once every Nth packet. The collection of N packets is referred to as "ACK window" or "transmission window." Setting the ACK request flag signals the recipient to positively acknowledge receipt of that packet by sending an ACK to the sender. Furthermore the last packet in the transmission window has the ACK requested flag set. The ACK requested flag is not used in the statistically reliable transmission mode.

Since multiple packets are sent in a message, the probability that a system will receive at least one of the packets in a message is increased. By adjusting the minimum number of packets sent per message based on the packet loss rate of the system, the probability that a system will receive at least one packet can be reduced to a very small number. Systems that receive only part of a message can identify its incompleteness and send a NAK that triggers a retransmission.

In a large network, it will usually occur that many systems may not have received at least part of a message. If each system sent a NAK, then the flood of NAKs could overwhelm the network. The invention employs NAK suppression techniques on both the sender side and recipient side. The recipients calculate a delay time based on a defined algorithm that will be used to send a NAK to the sender. This reduces the number of NAKs received by the sender. In response to a NAK the sender will retransmit the missed packet. Any additional NAKs received by the sender for the same packet will be ignored for a predetermined period of time after retransmission of the packet. This further reduces the traffic on the network by giving the retransmitted packet time to be received by any system that may have missed it. In addition, each retransmit increases the probability that every system in the network will receive at least one packet in a message. The NAK/retransmit procedure is repeated for some period of time.

In the positive reliability mode, the sender listens for and tracks ACKs by recipient. Thus, any recipient that does not return an ACK can be identified. Periodically, all systems that have not returned an ACK for a particular transmit window are identified and the last packet of the transmit window is resent to them.

Messages can indicate that a reply is requested. When a message requesting a reply is received by a recipient, the recipient sends a reply message. This reply is separate from the ACK/NAK procedure described above. Each message contains a message identifier, which is included in the reply so that when a reply message is received, the reply can be coupled to the original message. This allows multicast messages sent out to be correlated with the replies that are received.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for the hierarchical storage of data. The embodiments of the present invention may comprise a special purpose or general purpose computer comprising various computer hardware, as discussed in greater detail below.

Embodiments within the scope of the present invention also include computer readable media having executable instructions or data fields carried thereon. Such computer readable media can be any available media which can be accessed by a general purpose or special purpose computer. By way of example, and not limitation, such computer readable media can comprise computer storage media such as RAM, ROM, EEPROM, CD-ROM or other optical disk storage, magnetic disk storage or other magnetic storage devices, or any other medium which can be used to carry the desired executable instructions or data fields and which can accessed by a general purpose or special purpose computer. When information is transferred or provided over a network or other communications connection to a computer, the computer properly views the connection as a computer-readable medium. Thus, such a connection is also properly termed a computer-readable medium. Combinations of the above should also be included within the scope of computer readable media. Executable instructions comprise, for example, instructions and data which cause a general purpose computer, special purpose computer, or special purpose processing device to perform a certain function or group of functions.

Figure 1:
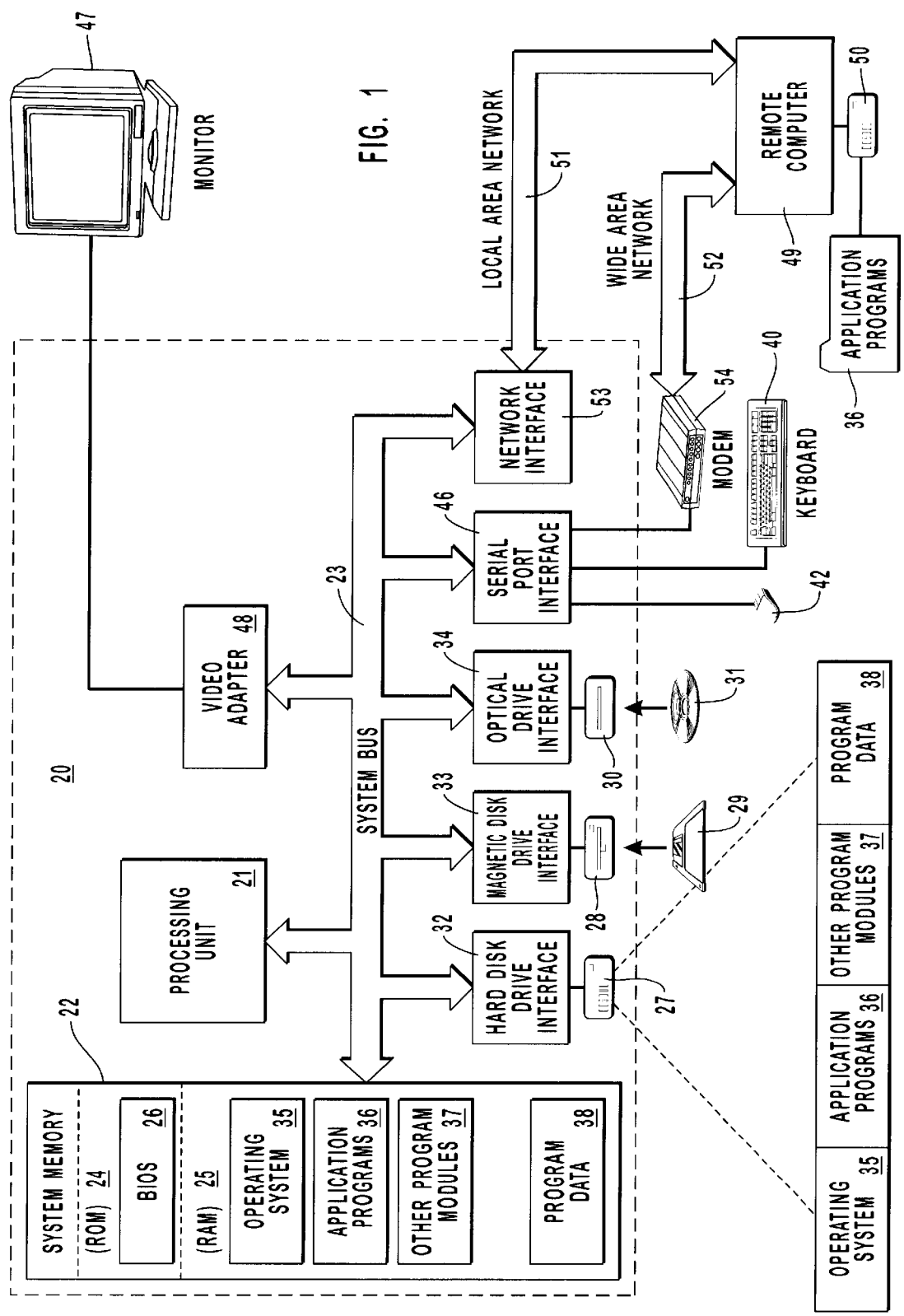
FIG. 1 is block diagram of an exemplary system for implementing the present invention that includes a general purpose computing device in the form of a conventional, personal computer.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus that couples various system components including the system memory to the processing unit 21. The system bus 23 may be any of several types of bus structures including a memory bus or memory controller, a peripheral bus, and a local bus using any of a variety of bus architectures. the system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer further includes a hard disk drive 27 for reading from and writing to a hard disk, not shown, a magnetic disk drive 28 for reading from or writing to a removable magnetic disk 29, and an optical disk drive 30 for reading from or writing to removable optical disk 31 such as a CD ROM or other optical media. The hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices' enterprise-wide computer networks, intranets and the Internet.

When used in a LAN networking environment, the personal computer 20 is connected to the local network 51 through a network or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
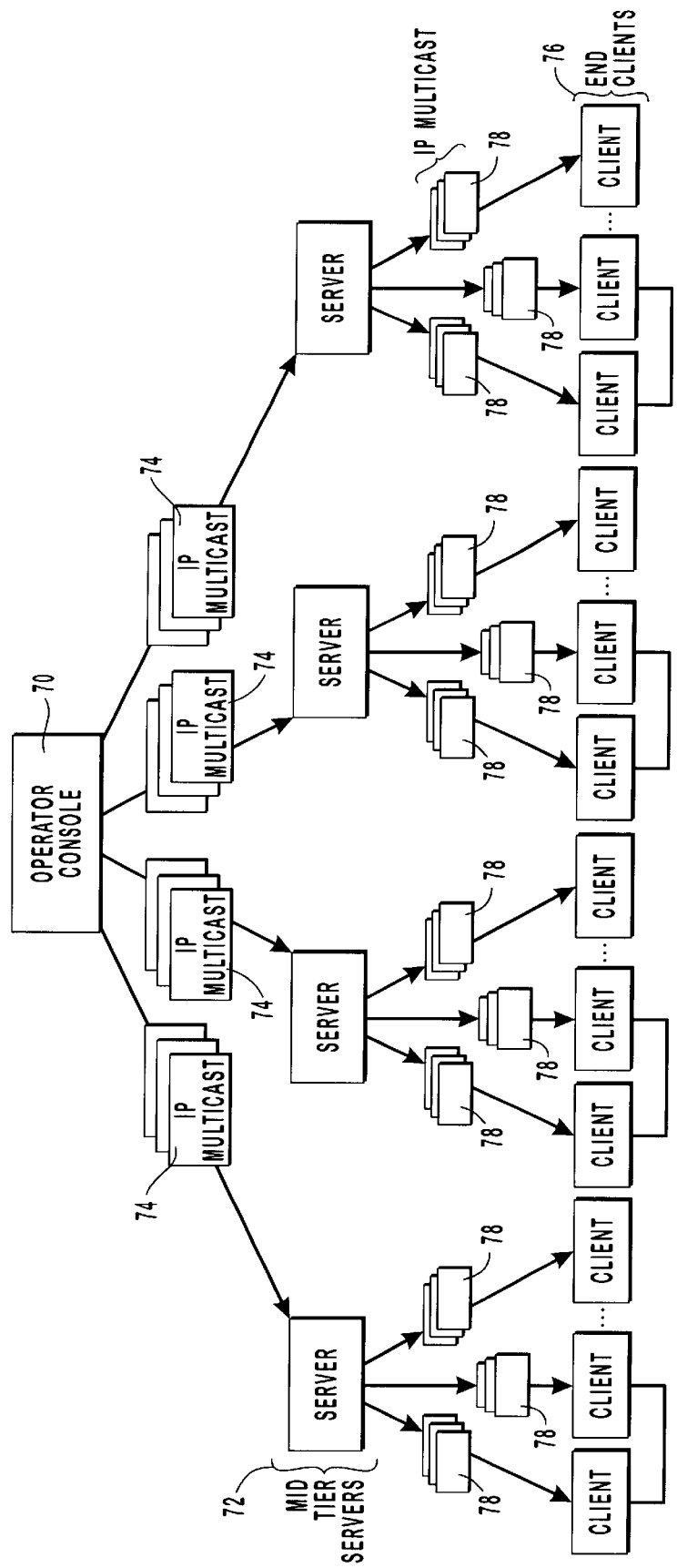
FIG. 2 is a system diagram logically showing a sending system and a number of receiving systems.

In certain environments, it is important to be able to transfer messages that fill relatively few packets from one computer to one or many other computers in a very reliable way. For example, FIG. 2 illustrates a basic network connection where an operator console 70 is used to control several mid-tier servers 72 and end clients 76. Such an environment may be representative, for example, of a situation where multiple systems in a distributed network are managed from a central operator console. To perform such management, it is often necessary to have a highly reliable communications path between the operator console and each of the managed systems. Furthermore, management functions may require bi-directional communications where messages are sent from an operating console to multiple managed systems and the individual managed systems respond to the message. The messages required to perform such centralized management are, in general, fairly short consisting of one packet to several hundred or thousand packets. Furthermore, efficiency considerations generally preclude utilizing a connection-based protocol such as TCP/IP. Connectionless protocols such as UDP or others that utilize IP multicast are efficient, but are also inherently unreliable since they do not guarantee delivery of any particular packet or delivery of packets in any particular order. Thus, in many existing networks, it is highly likely that at least some packets will be lost on occasion. The probability that any single packet is received by any single system is influenced by a wide variety of factors in the network which, together, result in a cumulative packet loss probability. The packet loss probability may be influenced by a variety of factors, some of which are physical including the cabling infrastructure of the network, and others of which vary with the amount of traffic on the network. For example, in a network where routers and other intermediate devices have a limited amount of buffering capability, it is possible that packets will be lost when buffer overflow is caused by packets being received at a rate faster than they can be transmitted.

Finally, messages should be able to be broadcast to a large number of recipients without creating a flood of acknowledgments or negative acknowledgments that overwhelm the network. As the number of systems in a network increase, the likelihood that a firestorm of acknowledgments or negative acknowledgments will overwhelm the network increases dramatically.

The present invention achieves both efficiency and reliability by building high-level protocols upon a basic UDP multicast protocol. Since UDP is inherently unreliable, reliability is added by layering additional protocols upon UDP. The result is a protocol that achieves the efficiency of UDP multicast with very high reliability. Embodiments within the present invention can operate in either a statistical reliability mode or a positive reliability mode. The statistical reliability mode can be adjusted to lower the probability that any system did not receive a message to a very small number. The positive reliability mode adds to the functionality of the statistical reliability mode by further providing senders with the knowledge of which intended recipients did and did not receive the message. Mechanisms of the present invention also allow responses received from recipients to be tightly coupled to the initial transmission that generated the response. This allows for bi-directional communication using the present invention.

Figure 3:
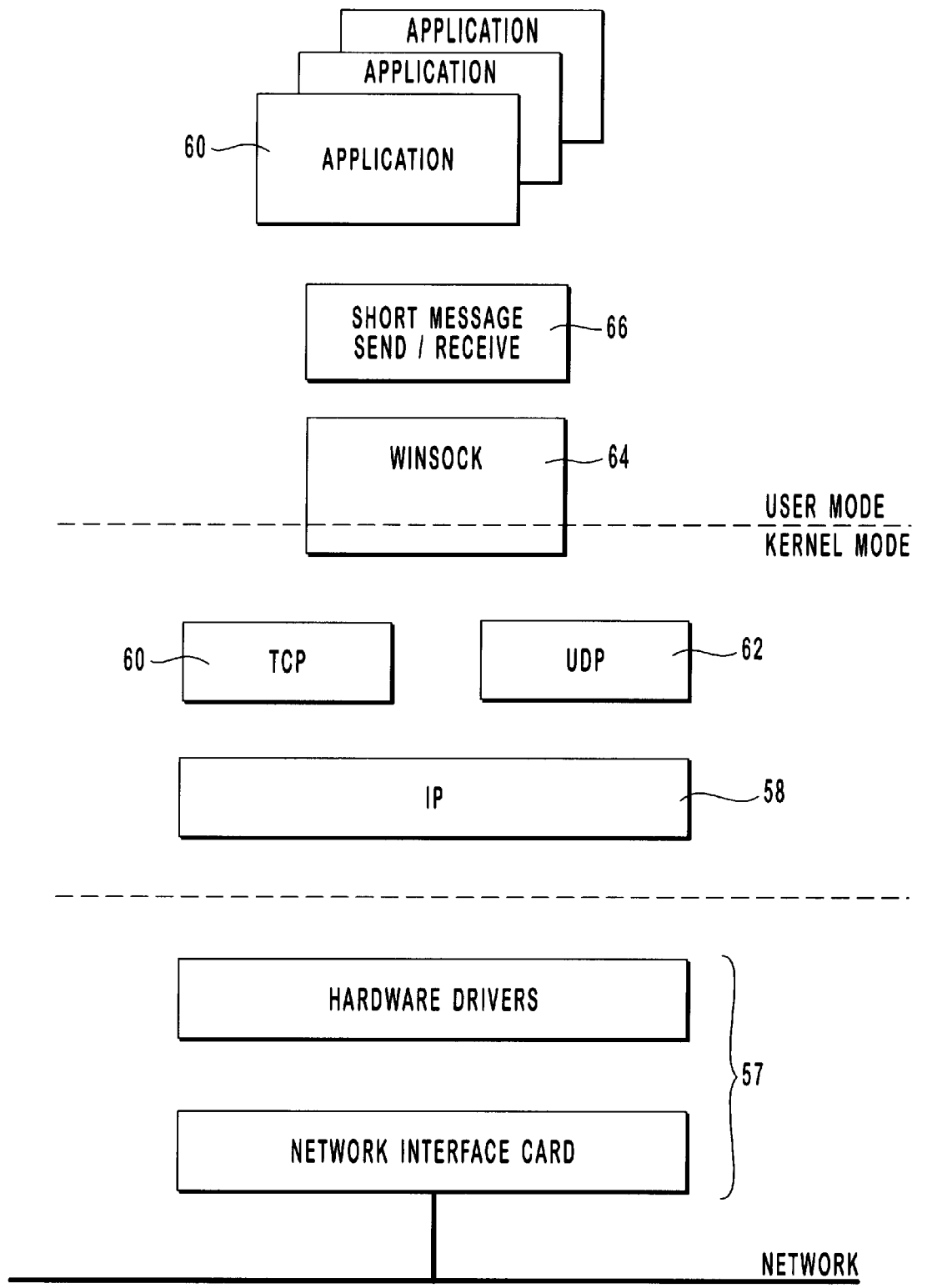
FIG. 3 is a logical diagram of the network protocol stack showing the location of the software for sending and receiving small messages according to the present invention.

Referring now to FIG. 3, a logical diagram showing elements of a network protocol stack gives a context to the present invention. Each system on the network uses a similar protocol stack to provide communications between systems. In general, each layer provides a higher level of functionality than the layer below it, and generally handles lower level tasks by utilizing the appropriate lower level functionality provided by the level below it. The protocol stack of FIG. 3 is representative of an example embodiment and should not be construed as limiting the scope of the invention. Other suitable protocol stacks may have different layers either in number or type.

The lower levels of the stack representing the hardware, hardware control, device drivers, etc. are represented by bracket 57 and are unimportant for explaining one illustrative embodiment of the present invention. On top of the lower levels is the Internet Protocol or IP layer 58 that provides basic communication services over heterogeneous networks using IP. A connection protocol, the Transmission Control Protocol or TCP layer 60 provides connections with other IP hosts based on an IP address and a port on the host. A connection protocol, such as the TCP layer 60, though very reliable requires too much overhead to create, maintain, and use for short messaging to large numbers of receiving systems.

A connectionless protocol, such as the User Datagram Protocol or UDP layer 62 provides low-overhead, high efficiency data transmission when used with IP multicast addresses. UDP, however, does not guarantee either receipt of packets or the order in which packets will be received. Because it is inherently unreliable by design, certain numbers of packets will likely be lost on networks of even moderate complexity and even more so when dealing with large numbers of receiving systems.

WinSock layer 64 provides an Application Program Interface (API) that allows higher level access to both TCP layer 60 and UDP layer 62. The Windows Sockets API provided by WinSock layer 64 provides a standardized Windows interface to various transports, such as TCP, UDP and IP so that the lower level details of the transports are hidden from the higher levels. Finally, a short message send and receive facility 66 manages communicating short messages between IP host systems according to the present invention. This facility provides services that allow many different applications, such as application 68, to simplify internal code development and take advantage of the reliable and efficient communication mechanism. Short message send/receive facility 66 can also provide a high level API that allows applications to take advantage of the functionality of short message send/receive facility 66 without worrying about many low level details of sending and receiving messages according to the present invention.

Embodiments of the present invention operate in a statistical reliability mode where message receipt by every receiving system is statistically very probable or in a positive reliability mode where each receiving system confirms message receipt. The probability of receiving a message using the statistically reliable mode can be adjusted by setting relevant parameters.

In order to ensure reliability, the statistical reliability mode of the present invention relies on the basic concept that if a network has a packet loss rate that is relatively constant over the time it takes to transmit and receive a series of packets, then the probability of receiving k packets out of n transmitted packets is given by the equation:

$$p_k = \binom{n}{k} p^k (1-p)^{n-k}$$

where:

$P_k$ is the probability of receiving k packets n is the total number of packets transmitted k is the number of packets received p is the probability of receiving a packet.

The probability that none of the transmitted packets are received by a recipient is given by:

$$p_f = p_o = (1-p)^n$$

the probability of receiving all the packets transmitted is given by:

$$p_s = p_n = p^n$$

and the probability of receiving at least one packet but less than all the packets is given by:

$$p_{ps} = 1 - (p_o + p_n) = 1 - (p_f + p_s)$$

As an example, if there are one thousand recipients, three packets are transmitted, and the packet loss rate is twenty percent, then the probability of failure, the probability of success, and the probability of partial success is given by:

$$P_{ps} = 1 - 0.2^3 = 0.008$$

$$P_{ps} = 0.8^3 = 0.512$$

$$P_{ps} = 1 - 0.512 + 0.008 = 0.480$$

Thus, statistically 512 recipients can be expected to receive all three packets, 480 recipients will receive some of the packets, and 8 recipients will receive none of the packets. The table below presents the probability of failure as a function of the packet loss rate and the number of packets transmitted. As illustrated in the table, for moderate packet loss rates even a relatively few transmitted packets result in a very low probability of complete failure. Thus, by adjusting the number of packets transmitted for a particular packet loss rate, the probability of failure can be reduced to a very small number.

Figure 4:
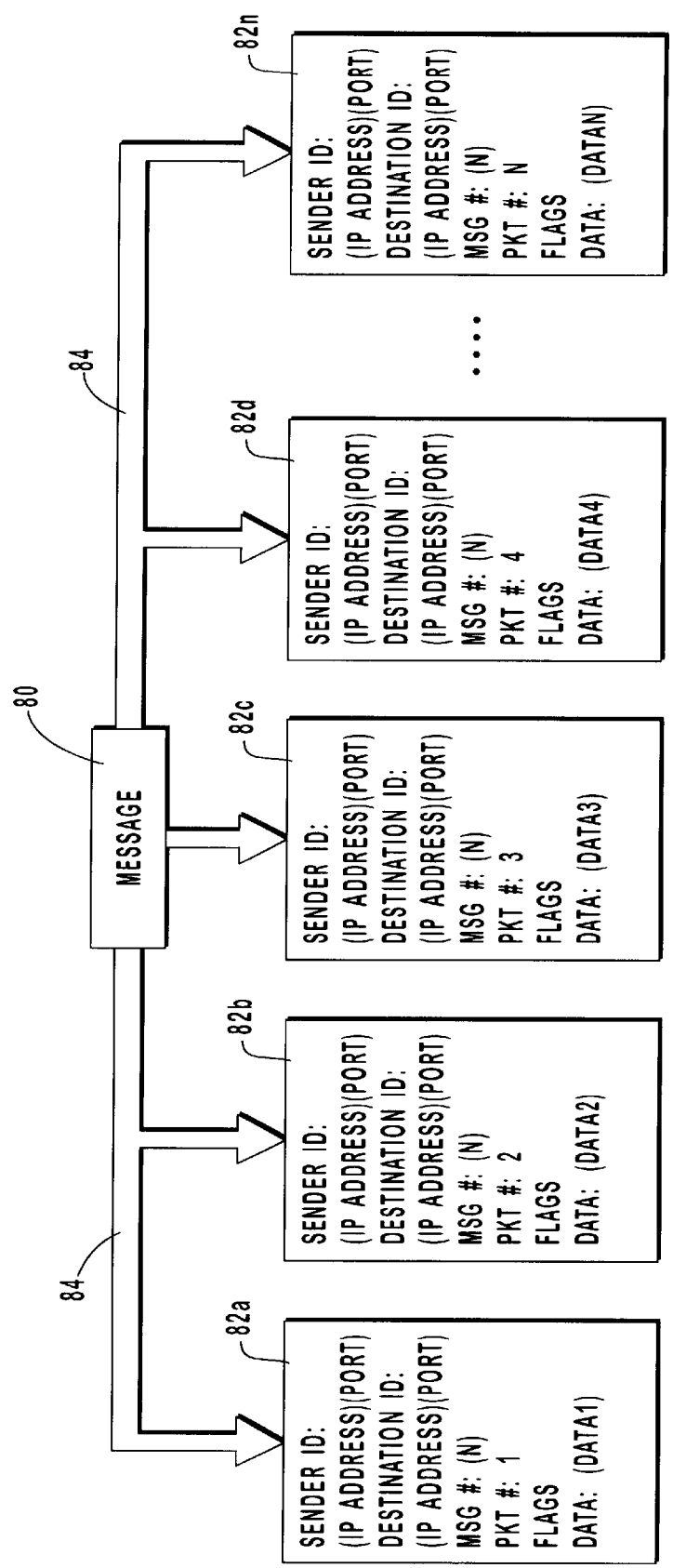
FIG. 4 is a logical diagram showing a message divided in to a plurality of transmission packets as used in the statistical reliability mode of the present invention.

In order to ensure reliable reception in the present invention, embodiments of the present invention transmit a guaranteed minimum number of packets. For messages that fill less than the minimum number of packets, the message is padded to the minimum number of packets. This process is illustrated in FIG. 4. A message 80 that is to be sent from a sending system to receiving systems using the present invention is received from an application and is broken up into a certain minimum number of packets 82a–82n. Even though a message may in many instances be effectively sent by one packet, as previously described, the message is padded to fill a certain minimum number so as to increase the likelihood that a system will at least receive one of the packets. As described below, if a system receives one packet, it can send a negative acknowledgment or NAK in order to cause a retransmission of the missing packets of the message.

Many methods may be used to pad a message to fill a minimum number of packets. For example, if the message may be broken down into data blocks, each of which fill a packet, if the number of data blocks is insufficient to fill a minimum number of packets, zero data blocks may be added to fill the required minimum number of packets. In the alternative, the last data block may be replicated a sufficient number of times until the required minimum number of data blocks is achieved. As yet another alternative, the pad packets may contain zero length data blocks (no data). Any other mechanism may also be used. For example, it may be desirable to fill pad data blocks with a designated pattern so that the recipient can identify that the data block is a pad data block. A similar function would be achieved by using packets with a zero-length data block. All that is required is that after the padding occurs a sufficient minimum number of packets exist.

Figure 5:
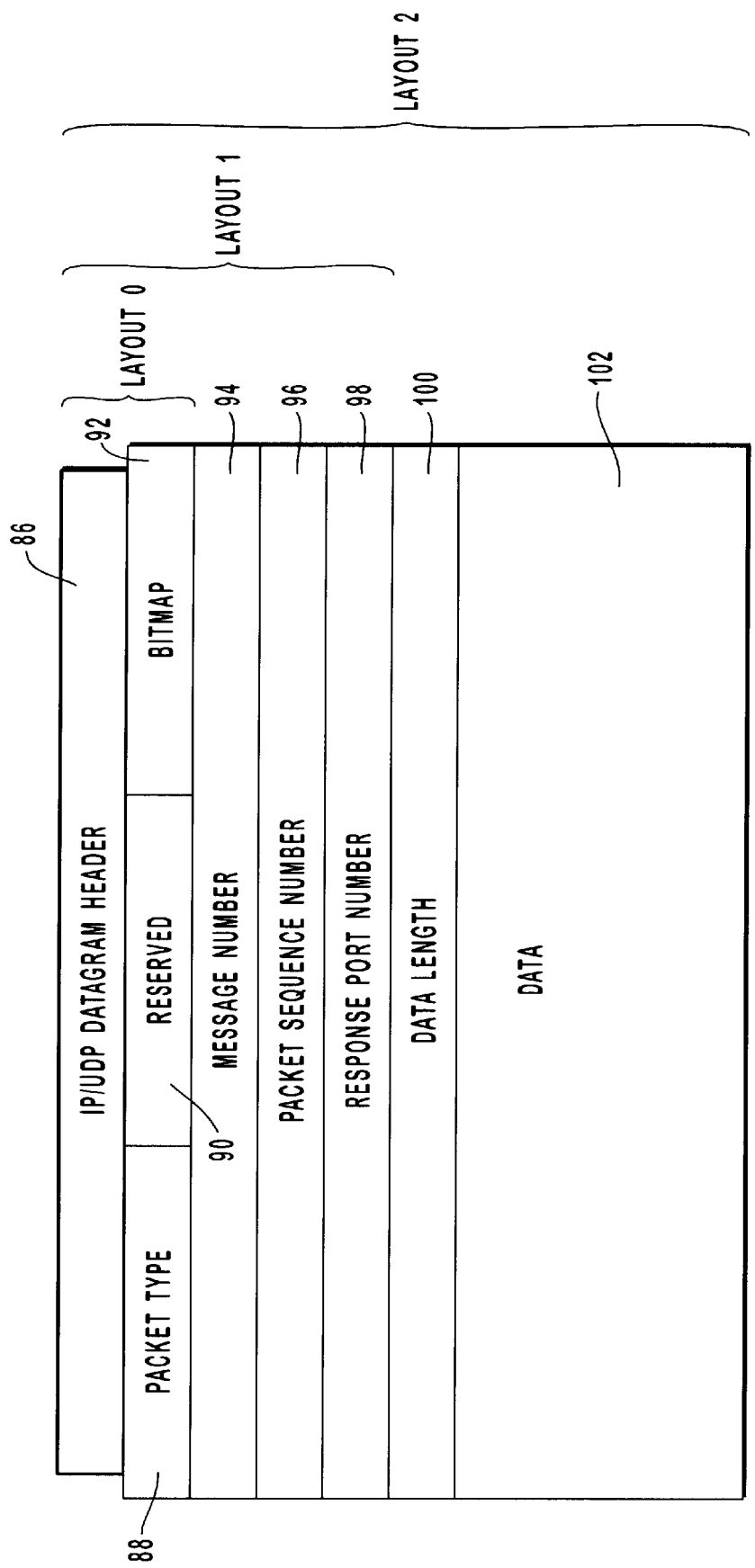
FIG. 5 illustrates representative transmission packets for one embodiment.

The exact contents of the individual packets used for the present invention will depend on a variety of factors, many of which depend on the particular feature set that is implemented in a particular embodiment. A detailed description of a packet format suitable for use with the present invention is illustrated in FIG. 5. Certain embodiments of the present invention are built upon the functionality provided by the IP and UDP protocols. Thus, packets transmitted using the present invention are encapsulated within UDP packets. This is true for both the statistical reliability mode and positive reliability mode of the invention. Both the statistical reliability mode and positive reliability mode utilize both multicast and point-to-point components. Both the multicast and point-to-point components are encapsulated within UDP packets. The protocols of the present invention depend upon the source and destination IP addresses and UDP ports in the

TABLE 1

Probability of Failure as a Function of the Packet Loss Rate and Number of Packets Transmitted

| | | Number of Packets Transmitted | | | | | | | | |
|---|---|---|---|---|---|---|---|---|---|---|
| | 1 | 2 | 3 | 4 | 5 | 6 | 7 | 8 | 9 | 10 |
| Packet Loss Rate | 10% 0.1 | 0.01 | 0.001 | 0.0001 | 1E–05 | 1E–06 | 1E–07 | 1E–08 | 1E–09 | 1E–10 |
| Packet Loss Rate | 20% 0.2 | 0.04 | 0.008 | 0.0016 | 0.0003 | 6E–05 | 1E–05 | 3E–06 | 5E–07 | 1E–07 |
| Packet Loss Rate | 30% 0.3 | 0.09 | 0.027 | 0.0081 | 0.0024 | 0.0007 | 0.0002 | 7E–05 | 2E–05 | 6E–06 |
| Packet Loss Rate | 40% 0.4 | 0.16 | 0.064 | 0.0256 | 0.0102 | 0.0041 | 0.0016 | 0.0007 | 0.0003 | 0.0001 |

IP and UDP portions of the datagram header. The IP and UDP portions of the datagram header are indicated in FIG. 5 by IP/UDP datagram header 86. In addition to the standard IP/UDP datagram fields, one embodiment of the present invention adds packet type field 88, reserved field 90, bitmap field 92, message number field 94, packet sequence number field 96, response port field 98, data length field 100, and data field 102. Packet type field 88 contains a coded identifier that identifies the particular packet type. Packet types used in the present invention are heartbeat packets, positive acknowledgment packets, negative acknowledgment packets, and data packets. Table 2 below summarizes the various packet types and the packet layout used for the particular packet type. The purpose of positive acknowledgment packet types will be explained in greater detail below. Heartbeat messages may be used by the network to build and maintain group memberships. Although a full discussion of heartbeat messages and group membership principles are beyond the scope of this document, in general the desire for groups comes from the desirability of broadcasting messages to a subset of systems, and the difficulty in requiring all systems to maintain address information for every system in a large network. Grouping the systems of a network into groups helps solve these problems. Heartbeat messages can be used to discover information about groups and maintain groups.

TABLE 2

| Packet Type | ASCII Character | Used For | Packet Layout |
|---|---|---|---|
| Heartbeat | x'16'- SYN | Heartbeat | 2 |
| Positive Acknowledgment | x'06'- ACK | Previous transmission received correctly | 1 |
| Negative Acknowledgment | x'15'- NAK | Expected transmission not received | 1 |
| Data | x'05'- ENQ | Transmit and Receive Data | 2 |

Reserved field 90 is not used and is reserved for future enhancements. Bitmap field 92 contains flags that are used by the protocol for various purposes. Table 3 below identifies the flags contained in bitmap 92 and their purpose.

TABLE 3

| Bit | Meaning | Values | Notes |
|---|---|---|---|
| x0001 | EOM | 0 or 1 | Set in the last data packet for the message. |
| x0002 | ACK Requested | 0 or 1 | Set in positive reliability mode when the sender wants an ACK in response. |
| x0004 | Reply Requested | 0 or 1 | Set when the sender wants a response message. |
| x0008 | Reply Requested Protocol | PosRel or StatRel | Required when Reply Requested is Specified. Default is PosRel |
| x0010 | Reply Message | 0 or 1 | Set on all packets in a Response message |
| x0020 | Reliability Mode | PosRel or StatRel | Reports the Reliability mode of all packets in a message. |
| Remainder | RESERVED | 0 | |

Message number 94 is a field that contains a message ID number for the particular message. The message ID number is the same for all packets in a particular message. In addition, when replies are sent to a particular message, the reply also contains the message number of the message so that when the reply is received, the reply can be identified as being received in response to a particular message. Use of the message number allows requests and responses to be tightly bound so that the system can identify which responses go with which requests without enforcing any particular type of synchronous or connection-based protocol.

Packet sequence number 96 is a number that is incremented for each packet in the message. This allows a recipient to identify whether all packets of the message have been received in order to send NAKs requesting retransmission of missed packets. Response port 98 is the UDP port number that should be used for returning responses to the message. Data length field 100 identifies the length of data field 102 so that a recipient can extract all of the data field. Data field 102 contains the data to be transmitted in the packet.

As indicated in FIG. 5, the packets have various layouts, illustrated as layout 0, layout 1, and layout 2. The packet layout for a particular packet type is summarized in Table 2.

Although some detail is presented in FIG. 5 with respect to a particular packet implementation, such is presented by way of example only. Thus, FIG. 5 should not be construed as limiting the scope of the present invention. Other embodiments may utilize different packet types, according to the particular feature set implemented by that particular embodiment. In general, however, most implementations will contain at least the destination ID, the sender ID, each of which comprise an IP address and a port number, and a data field for those packets that transfer data. The purposes of the other fields have been previously explained and, as illustrated more completely in the remainder of this discussion, are used to implement or enhance various feature sets that may be incorporated into various embodiments of the present invention.

Returning now to FIG. 2, the conceptual operation of the statistical reliability mode of the present invention will be described. Consider that operator console 70 wishes to send a particular message to end clients 76. Operator console 70 will take the message and, as described in conjunction with FIG. 4 above, will create at least the minimum number of packets necessary for the desired level of statistical reliability. The packets will then be transmitted using a multicast protocol, such as IP multicast, indicated in FIG. 2 by IP multicast packets 74. The multicast packets will be received by mid-tier servers 72 and evaluated. Since the packets are ultimately destined for end clients 76, mid-tier servers 72 will transmit further multicast packets, such as IP multicast packets 78, to end clients 76.

Based on the statistical model above, some end users may receive all packets, some may receive some packets, and some may receive no packets. By examining the packet sequence number and, perhaps, the end of the message flag, systems that receive less than all the packets can transmit a NAK requesting retransmission of the missed packets. For example, if an end client 76 does not receive a packet in a message from mid-tier server 72, then end client 76 may send a NAK to mid-tier server 72. Mid-tier server 72 would receive the NAK and retransmit the requested packets. A similar approach would be followed if a particular mid-tier server 72 did not receive one or more packets from operator console 70. In such a case, mid tier-server 72 would send a NAK to operator console 70. Operator console 70 will receive the NAK and retransmit the requested packets. Other types of networks, not necessarily organized like the network illustrated in FIG. 2, may use this protocol between any sending system and any number of receiving systems.

Retransmission of packets requested in a NAK may result in systems that received no packets or systems that received less than all the packets receiving more packets than they received initially. Based on the statistical model above, each rebroadcast of one or more packets increases the statistical likelihood of the systems receiving all necessary packets. The NAK/retransmit procedure can be continued for a designated period of time or until certain statistical criteria are met.

Although conceptually the above description results in the ability to diminish the statistical likelihood of any systems not receiving the information they need to an arbitrary minimum, in reality such an approach would create severe problems in many practical installations. Using an example previously presented, if the packet loss rate was twenty percent and if three packets were transmitted to one thousand recipients, statistically we could expect that 512 recipients would receive all three packets, 480 recipients would receive one or two packets, and eight systems would receive no packets. If all 480 systems sent NAKs to the sender, the volume of network traffic may completely overwhelm the network. As the numbers of systems in a network increase, the problem becomes more pronounced and more serious. Ideally, only a sufficient number of systems would respond with NAKs to guarantee that the sender received one NAK for each packet that was missed. Practically, although achieving this ideal is difficult, various steps may be taken to reduce the flood of NAKs.

Figure 6:
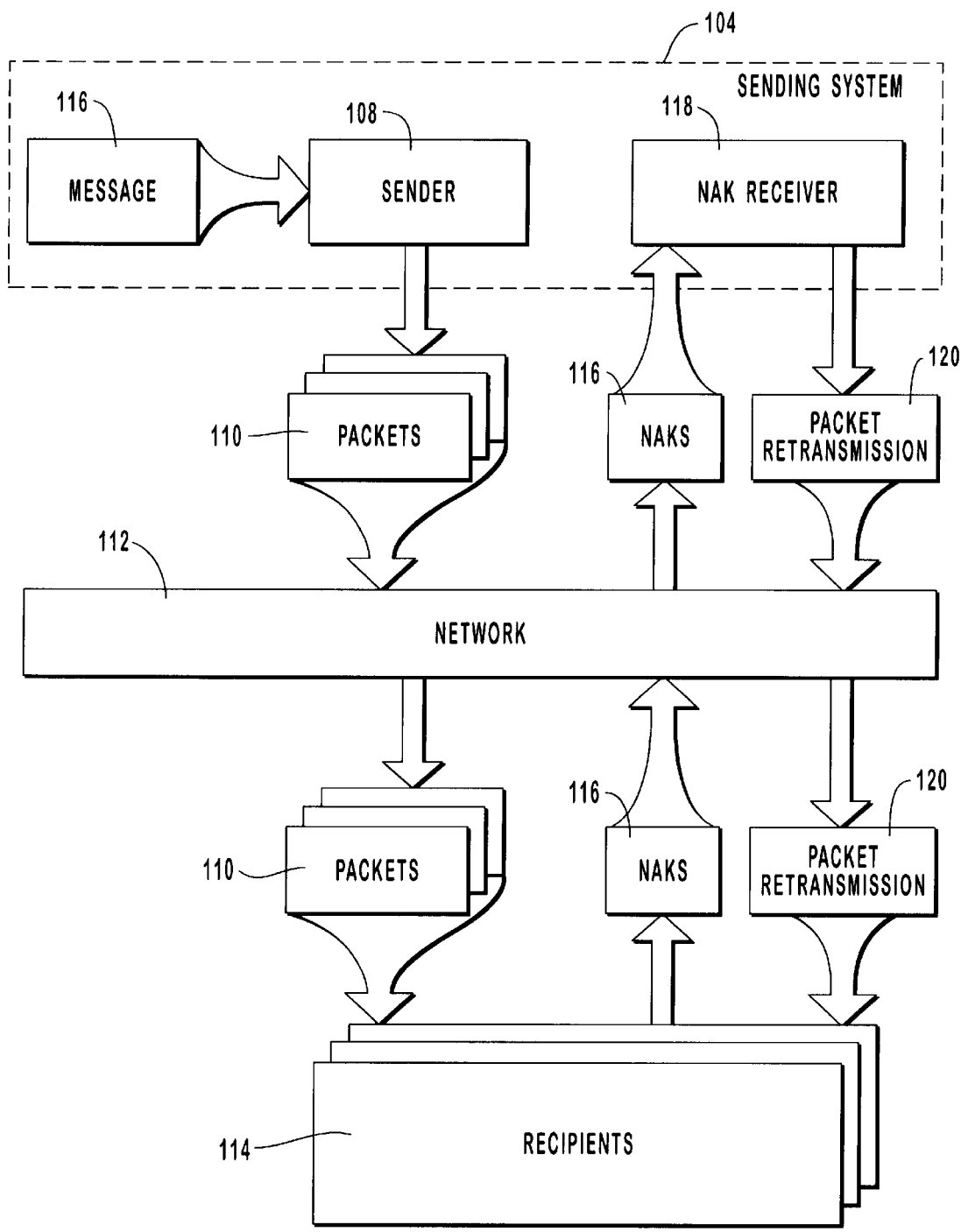
FIG. 6 illustrates a sending system operating in the statistical reliability mode.

Embodiments of the present invention may utilize suppression techniques at both the recipient and the sender to approximate the desired behavior of the network. As explained below, these suppression techniques may be part of a means for reducing network traffic during recovery of lost packets. In essence, each recipient selects a delay time based on a probability density function having specific characteristics and when the NAK delay time arrives, transmits its NAK request if it has not already received the desired packet. On the sender side, once a packet has been retransmitted, the sender will ignore NAKs for the retransmitted packet within a specified time period after the retransmission. By way of example, and not limitation, in FIG. 6 such means is illustrated by NAK receiver 118. NAK receiver 118 listens for NAKs and retransmits packets according to methodologies that will be explained hereafter. In FIG. 6 the retransmission of appropriate packets is illustrated by packet retransmission 120.

In FIG. 6, sender 108 and NAK receiver 118 may be implemented in a variety of ways using a variety of technologies. If sending system 104 is a multithreaded system, then sending system 104 may implement sender 108 and NAK receiver 118 as separate threads. Other appropriate implementations may also be utilized.

Figure 7:
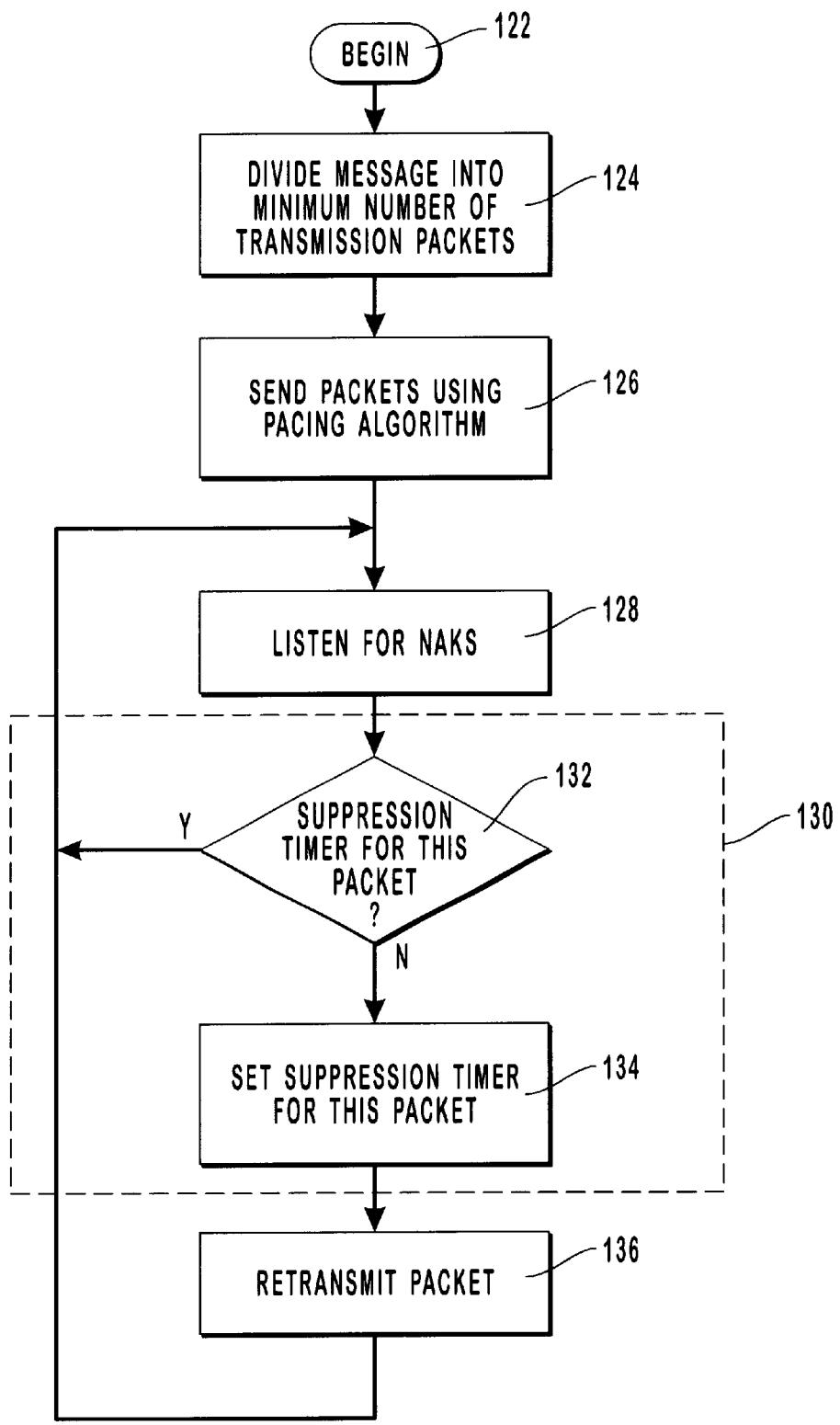
FIG. 7 is a flowchart showing the processing steps taken by the sending system in the statistical reliability mode of the present invention.

Referring now to FIG. 7, a flowchart representing the processing steps taken by the sending system according to one embodiment of the present invention in order send a message to receiving systems is shown. FIG. 7 may represent, for example, the processing performed by sender 108 and NAK receiver 118 of FIG. 6. After beginning at step 122, the message is divided into at least the requisite minimum number of transmission packets for desired reliability in step 124. This occurs as previously described in conjunction with FIG. 4 above. Note that if the message doesn't require all of the packets then extra packets are added as previously described above to arrive at the minimum number of packets. These padding packets, even if not carrying data, are used to determine completeness of the message at the receiving system. The last packet will have the Last Packet or end of message flag set, and each packet will have a unique sequential packet number. Step 124 is, therefore, only one example of a means for dividing a message into a plurality of individual transmission packets and for adding additional transmission packets if the message fills less than a minimum number of individual transmission packets.

After the transmission packets have been created, the message is sent by sending each packet onto the IP network using the UDP multicast facility to a group of designated receiving systems. The transmission rate of the packets can influence the packet loss rate of the network. For example, in a network having routers and other systems that buffer and forward messages, if the packets are transmitted too fast, the buffer space can overflow, resulting in lost packets. Embodiments within the scope of the present invention may, therefore, comprise means for pacing transmission of packets. By way of example, and not limitation, in FIG. 7 such means is illustrated by step 126 which sends packets using a pacing algorithm designed to transmit packets in such a manner that the transmission has little or no effect on the packet loss rate. The pacing algorithm reduces network overhead since it is responsive to general network packet error trends and sends packets out at greater intervals (lower packet transmission rate) when the network is performing at a lower level. Pacing algorithms may thus comprise means for selecting a transmission rate based on network performance levels. Examples of such means are presented hereafter.

Ideally, a pacing algorithm should allow the system to transmit packets as rapidly as possible without adversely effecting the packet loss rate of the network. In general, the packet loss rate is a very complex function of many different parameters, at least some of which fluctuate over time. Some of the factors are related to hardware and the particular network infrastructure being utilized to communicate between systems. Other factors are influenced by the internal processing load of individual systems on the network. Because so many factors can influence the packet loss rate of the network, it would be very difficult to calculate a priori what the packet loss rate would be for any given particular network configuration. Thus, the present invention utilizes an approach which takes a measurement of the network packet loss rate and adjusts the transmission rate based on the packet loss rate in order to prevent the transmission rate from adversely effecting the system packet loss rate.

Many different methodologies can be developed to use the packet loss rate of the system to determine a transmission rate for the sender. Each of these is properly an example of means for selecting a transmission rate. Pacing algorithms that perform well, however, should have certain characteristics. In general, the transmission rate for a sender will be limited between some minimum and some maximum value. The minimum value is necessary so that the sender transmits packets at at least some minimum rate no matter what the network conditions are. If the sender did not transmit any packets, then network protocols would break down completely. Thus, even in the worst conditions the sender needs to transmit packets. Placing a maximum value on the transmission rate is often advisable to prevent the sender from totally overwhelming the network. The minimum and maximum transmission rate are often set based on testing or other methodologies that create acceptable minimum and maximum values.

When the packet loss rate is used to adjust the transmission rate, typical pacing algorithms rely on damping, filtering, weighting, and smoothing techniques to achieve performance levels that approximate ideal conditions. In general, the selected pacing methodology should respond to actual increases or decreases in packet loss rate while being relatively immune to small numbers of continuous errors and small bursts of errors so that they do not immediately trigger a reduction to minimum transmission rates.

In general, it is very difficult to directly measure the network packet loss rate. However, measurements exist which are indirect indicators of the packet loss rate. One such measurement is the number of NAKs received in response to prior transmissions. Since the statistical reliability mode of the present invention require systems that received at least one, but less than all of the packets in a message to NAK for packets they did not receive, the NAK rate is an indicator of the system packet loss rate. In using the NAK rate as an indicator of the packet loss rate, certain factors must be taken into account. For example, if the system employs NAK suppression in order to reduce the firestorm of NAKs that may be created when packets are lost in the network, the NAK rate may be artificially low for a given packet loss rate. It is possible, however, to factor in the effects of NAK suppression so that the pacing algorithm exhibits appropriate sensitivity to the measured NAK rate. For example, if the NAK suppression methodology filters out a relatively fixed quantity of NAKs, then each NAK measured may represent many such possible NAKs, most of which were never sent. If the NAK suppression algorithm has a time varying component, such as a NAK suppression algorithm which is constructed to initially send relatively few NAKs but thereafter sending an increasing number if the initial NAKs were not answered, then it may be necessary to adjust the sensitivity of the pacing algorithm to the time varying nature of the NAK suppression algorithm. For example, after an initial transmission of a message, any NAKs received relatively soon thereafter may be weighted relatively more (since they represent a relatively larger portion of suppressed NAKs) and NAKs received at a later time may be weighted relatively less (since they represent a relatively smaller portion of suppressed NAKs).

Another factor that may considered when designing a pacing algorithm is the statistics of received NAKs. For example, a steadily rising NAK rate may indicate degrading network conditions and steadily increasing packet loss rate. In such a situation, it may be desirable to construct a pacing algorithm that gradually reduces the transmission rate until the minimum is reached. Similarly, the pacing algorithm may respond to a steadily decreasing NAK rate by gradually increasing the transmission rate to the maximum value. For NAK rate increases or decreases that are of relatively short duration, such as might indicate a burst of dropped packets, the pacing algorithm should generally be immune to such bursts and leave the transmission rate relatively unchanged at the end of the burst. For NAK rates that are relatively steady above or below the desired threshold, the transmission rate should gradually be reduced to the minimum or raised to the maximum, respectively.

These general characteristics may be achieved using a wide variety of pacing methodologies. Filtering and estimation theory provides a rich set of methodologies that are applicable to this type of problem. Control theory also has a wide variety of analytical tools and approaches that are applicable to this type of problem. For example, optimal or suboptimal filtering techniques designed to receive a measurement and product therefrom an estimated quantity that can be used to adjust the transmission rate may be used. Such methodologies generally involve a tradeoff between computational burden and estimation accuracy. In this situation, many of the more simplified models will likely produce adequate results. Such simplified models include alpha filters, alpha-beta filters, suboptimal Kolman filters, and the like. In one embodiment of the present invention, the transmission rate is adjusted through a mechanism that lowers the transmission rate by a variable amount that is dependent upon how far the NAK rate exceeds the desired threshold and increases the transmission rate at a fixed amount when the NAK rate is below a desired threshold.

In the illustrative embodiment, the transmission rate is calculated using an iterative function that is updated at an appropriate time, as for example prior to each new message transmission or according to a time-based criteria that sets a minimum or maximum update time. The transmission rate at the $n^{th}$ iteration is calculated as a weighted average of a raw transmission rate from the $n^{th}$ iteration and a raw transmission rate from the $(n-1)^{th}$ iteration according to the following equation:

$$R_{wn} = \alpha R_{rn} + (1-\alpha) R_{r(n-1)}$$

Where:
- $R_{wn}$ is the weighted transmission rate used to transmit packets;
- $R_{rn}$ is the raw transmission rate on the $n^{th}$ iteration;
- $R_{r(n-1)}$ is the raw transmission rate on the $(n-1)^{th}$ iteration;
- $\alpha$ is a weighting factor which slows the rate of change in the transmission rate.

The raw transmission rate on the $n^{th}$ iteration is calculated by:

$$R_{rn} = R_{w(n-1)} + \Delta_r$$

Where:
- $R_{w(n-1)}$ is the weighted transmission rate on the $(n-1)^{th}$ iteration, calculated using the equation previously presented;
- $\Delta_r$ is the raw change in transmission rate calculated as shown below; and
- $R_{rn}$ is limited to the range $R_{min} \leq R_{rn} \leq R_{max}$, where $R_{min}$ and $R_{max}$ represent the minimum and maximum allowable transmission rates, respectively.

The change in transmission rate, $\Delta_r$ is calculated using the equation:

$$\Delta_r = \begin{cases} -\Delta_{NAK} * R_{\Delta B} & \text{if } \Delta_{NAK} > 0 \\ R_{\Delta B} & \text{otherwise} \end{cases}$$

Where:
- $\Delta_r$ is the change in change in transmission rate;
- $R_{\Delta B}$ is the base change in transmission rate; and
- $\Delta_{NAK}$ is the amount the measured NAK rate is above the desired NAK rate and is calculated as illustrated below.

In the above equation, the amount that the measured NAK rate is above the desired NAK rate is calculated using the equation:

$$\Delta_{NAK} = \begin{cases} R_{NAK} - T_{NAK} & \text{if } R_{NAK} - T_{NAK} > T_{\Delta NAK} \\ 0 & \text{otherwise} \end{cases}$$

Where:
- $\Delta_{NAK}$ is the amount that the measured NAK rate is above the desired NAK rate;
- $T_{NAK}$ is the desired NAK rate;
- $T_{\Delta NAK}$ is a damping factor that represents the difference in the NAK rate versus the prior period that must be exceeded before the transmission rate will be reduced; and
- $R_{NAK}$ is the measured NAK rate.

Often it is desirable to deal with the NAK rates and other NAK quantities as NAKs per second per 1,000 systems in the network. If this is the case, then $R_{NAK}$ in the prior equation may be calculated by:

$$R_{NAK} = \left(\frac{NAK}{population}\right) 1000$$

Where:
- $R_{NAK}$ is the NAK rate per 1,000 systems in the population per second;
- NAK is the number NAKs received per second; and
- population is the number of systems in the network that may transmit NAKs.

The performance and operation of the above system of equations can be optimized by changing the various constants and thresholds identified in the equations. In addition, certain parameters generally require selection of an initial value before the system of equations is iterated. In general, selection of the values of the various parameters and the initial starting values will be based on empirical data measured during test operations of the system. The desired values will be heavily dependent upon the exact installation and type of network encountered. In one embodiment, the following values are used:

| | | | | | |
|---|---|---|---|---|---|
| $T_{NAK}$ | = | 5 | $R_{min}$ | = | 250 |
| $T_{\Delta NAK}$ | = | 2 | $R_{max}$ | = | 2,000 |
| $R_{\Delta B}$ | = | 100 | $R_{w0}$ | = | 750 |
| $\alpha$ | = | 0.5 | $R_0$ | = | 750 |

In the above list, $R_{w0}$ and $R_0$ are the initial starting values of the weighted transmission rate and raw transmission rate, respectively.

Returning now to FIG. 7, at step 128, the sending system will wait for NAKs from the receiving systems so that it can retransmit any missed packets. In order to reduce the amount of network traffic, embodiments may comprise means for suppressing packet retransmissions. Such a means may be a portion of means for reducing network traffic during recovery of lost packets which suppresses both NAKs produced when packets are not received by an intended recipient and suppresses retransmission of replacement packets in certain circumstances. By way of example, and not limitation, in FIG. 7 a means for suppressing packet retransmissions is illustrated by the retransmission suppressor, enclosed by dashed line 130.

Retransmission suppressor 130 is designed to suppress retransmission of a packet requested by a received NAK if the packet was previously sent within a designated time frame. This gives retransmitted packets time to propagate through the network and be received before they are retransmitted a second time. One implementation of retransmission suppressor 130 sets a suppression timer each time a packet is transmitted. The same packet will not be retransmitted again until the suppression timer for that packet expires. The value of the suppression timer will depend on the expected propagation time in the network.

At step 132, a test is made to see if there is a suppression timer running for this packet. If so, the NAK is ignored since a retransmission has already occurred and that particular receiving system may already have or shortly will have the missing packet. If the suppression timer is not running as determined at step 132, one is started for this packet at step 134 and the packet is retransmitted, again using UDP multicast, at step 136. The multicast is used so that all receiving systems that may have missed the packet previously will have an opportunity to receive it. As described below, means for suppressing requests for retransmission of packets may also be part of means for reducing network traffic during recovery of lost packets, such a means for suppressing requests for retransmission of packets works in conjunction with receiving system processing to reduce the actual number of NAKs generated when a packet is lost. For the embodiment illustrated in FIG. 6, steps 124 and 126 of FIG. 7 may be incorporated into sender 108 while the remainder can be incorporated into NAK receiver 118.

Figure 8:
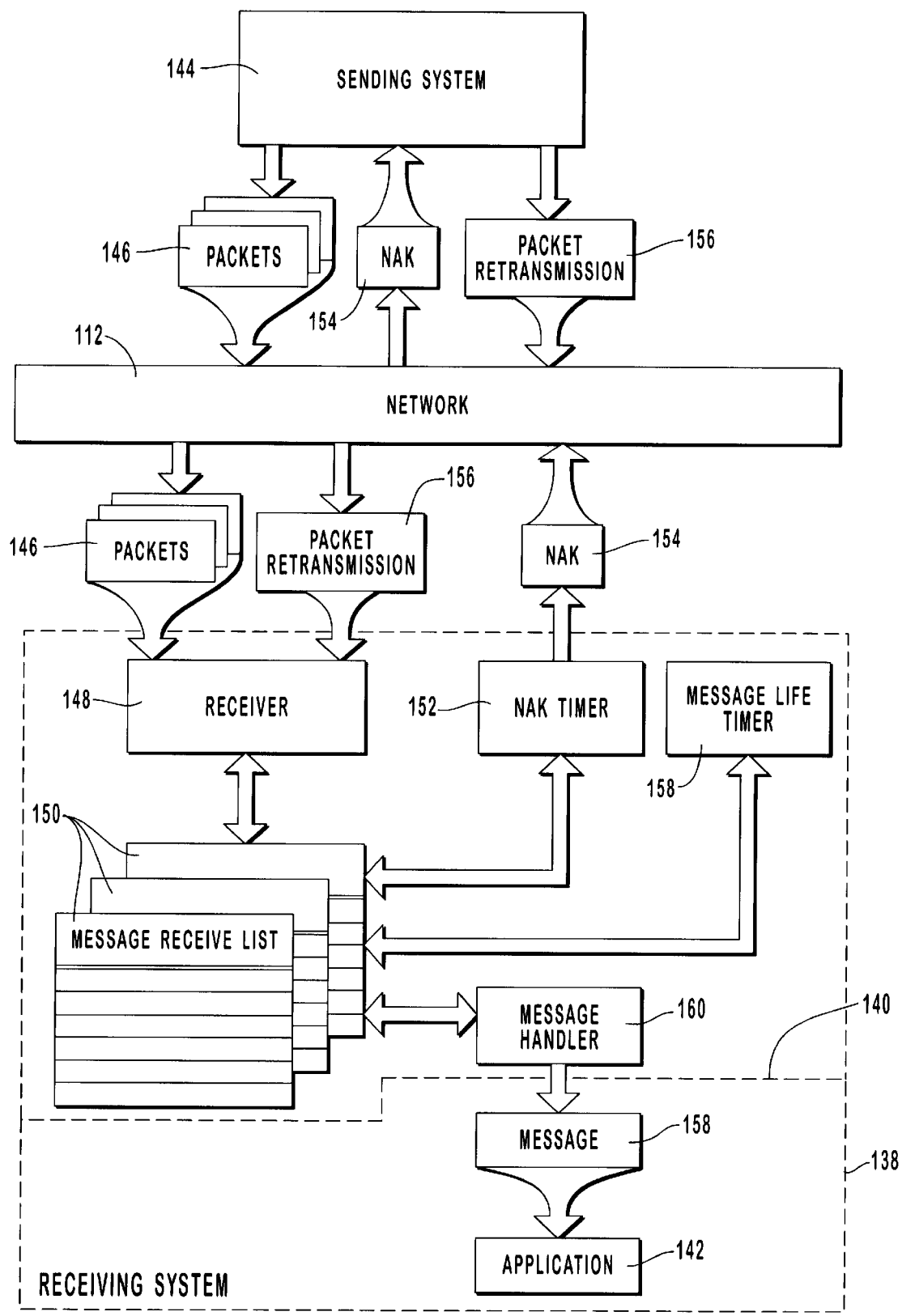
FIG. 8 illustrates a receiving system operating in the statistical reliability mode.

Turning now to FIG. 8, a structural representation of the processing that occurs in a receiving system or recipient when a message is received using the statistical reliability mode is illustrated. In FIG. 8, receiving system 138 is divided by dashed line 140. The components above dashed line 140 represent the components provided by the present invention in order to provide received messages to applications, such as application 142 executing on receiving system 138. The components above dashed line 140 may be incorporated, for example, into a short message send/receive facility such as that illustrated by block 66 of FIG. 3.

As previously described, when a sending system, such as sending system 144 wishes to send a message to a receiving system using the statistical reliability mode, such as receiving system 138, the message is broken down and a guaranteed minimum number of packets is transmitted. In FIG. 8, sending system 144 may implement this functionality as previously described in conjunction with FIGS. 6 and 7 above. Packets 146 are transmitted via network 112 and are received by receiving system 138. Thus, embodiments within the scope of this invention may comprise means for receiving packets. By way of example, and not limitation, in FIG. 8 such means is illustrated by receiver 148. Receiver 148 is responsible for receiving packets and placing them in the proper order. Receiver 148 continually listens for packets. A message starts on the reception of the first received packet and continues until either all packets in the message are received or until the message times out and is removed. Note that the first received packet may not be the first packet of a message. The timing out and removing of messages is described in greater detail below.

Normal processing of receiver 148 comprises assembling packets of a message in packet sequence number order. Messages are kept by message number and by source IP address. Since messages may have to be buffered until all packets are received, embodiments within the scope of this invention may comprise means for storing received packets until an entire message is received. By way of example, and not limitation, in FIG. 8 such means is illustrated by message receive list 150. As indicated in FIG. 8, a message receive list is created for each incoming message. It is used to reassemble packet streams into messages and identify the sender during reception. Message receive list 150 may comprise a variety of information, depending upon the exact implementation and the exact feature set implemented. In one embodiment, message receive list 150 comprises the source IP address and source UDP port number, the message number, a message completely received flag, a pointer to a message buffer, a message handle or other appropriate identifier, the time stamp of the last packet received, the time stamp of the last packet heard, and the time stamp of the last handoff of a packet to the application. Other embodiments may implement other or different fields within the message receive list. For example, it may be desirable to include actual buffer memory with message receive list 150 rather than a pointer to a separate message buffer. The exact implementation will depend upon various considerations such as the implementation details of the protocol stack used by receiver 148 to receive packets from network 112.

When a gap in the packet sequence is detected by the reception of a packet with a non-sequential packet sequence number, a NAK wait timer is started. At the expiration of the NAK wait time, a NAK is transmitted to sending system 144 to notify sending system 144 that a packet has been missed. Embodiments within the scope of this invention may comprise means for transmitting a request for packet retransmission. By way of example, and not limitation, in FIG. 8 such means is illustrated by NAK timer 152. NAK timer 152 may watch message receive list 150 to detect non-sequential packet numbers. In the alternative, receiver 148 may notify NAK timer 152 when non-sequential packets have been received. As yet another alternative, the detecting of a non-sequential packet number, as well as starting the NAK wait timer may be incorporated into receiver 148. How this functionality is implemented will be based on a variety of design choices that need to be made for any particular implementation. In the embodiment illustrated in FIG. 8, conceptually NAK timer 152 is responsible for setting the NAK wait timer when a non-sequential packet is detected and for transmitting a NAK to sending system 144 when the appropriate NAK timer has expired.

The use of a NAK wait timer to determine when to send NAKs provides several advantages. As previously explained above, if every system that did not receive a packet sent a NAK as soon as the missed packed was detected, the network may be completely choked with NAKs. Thus, it is desirable to space NAKs between systems so that the NAKs that are sent are distributed in an appropriate manner so that the transmission characteristics of the network are not adversely affected. Furthermore, since lower-level protocols, such as UDP may not guarantee reception of packets in numerical order, it is often desirable to wait a short period of time before sending a NAK for the packet to see if the packet will show up. Thus, embodiments within the scope of this invention may comprise means for suppressing requests for retransmission of packets. As previously explained, such a means may be one component of an overall means for reducing network traffic when recovering lost packets. By way of example, and not limitation, such a means for suppressing requests for retransmission of packets may comprise a NAK suppressor incorporated into NAK timer 152.

A NAK suppressor may comprise a wide variety of structures and methodologies to reduce the flood of NAKs that would occur if receiving systems immediately sent a NAK when a packet was received out of sequential order. In its most basic form, the NAK suppressor comprises a NAK wait timer that is set to a random value when a packet is received out of numerical order. Setting the timer to a random value randomizes the probability of transmitting a NAK and distributes the number of NAKs transmitted over a longer time period. As disclosed below, much more sophisticated NAK suppression methodologies are available, however.

Returning for a moment to FIG. 2, when operator console 70 multicasts a plurality of packets to end clients 76, some systems will receive all transmitted packets, some systems will receive less than all of the packets transmitted, and some systems will receive none of the packets transmitted. Ideally, operator console 70 would receive only one NAK for each packet that was not received by any system in the network. For example, if various systems in the network did not receive two packets among the many that were transmitted, then ideally operator console 70 would only receive one NAK for each of the two packets that were not received. Although it is difficult to achieve this ideal in practice, NAK suppressors that have certain characteristics can approach this ideal.

In one embodiment of the present invention, the NAK suppressor utilizes a timer to delay transmission of NAKs. The value of the timer is set using a pseudo random number having a specific probability density function that creates relatively few NAKs early on and relatively more NAKs later. By tailoring the probability density function on the NAK timer, a situation can be created where among a population of recipients that did not receive a particular packet, a few systems will NAK relatively soon after the packet is missed. As long as the system receives these NAKs and responds with the appropriate packets, systems whose NAK timer was biased toward a later time will receive the packet before their NAK timer expires. If, however, the sending system does not receive the NAK and respond with a retransmission of the appropriate packet, then relatively more systems will NAK. By matching the probability density function to the particular packet lost characteristics of the network, performance approaching the ideal can be achieved.

When constructing the probability density function of the NAK timers, several factors must be taken into account. These factors may be summarized as follows:

1. The probability density function should have a fairly sharp corner near the minimum desired value to provide a definitive cutoff point for the minimum timer value.
2. The low-end probability density function should be decreased as the network size is increased so that the overall number of systems that NAK early is relatively independent of the network size.
3. The probability distribution of the probability density function should make it highly probable that a few systems will NAK relatively early.
4. The probability density function should be relatively immune to the minimum and maximum NAK wait times so that the probability that a NAK will be sent by a particular system is relatively unchanged as a percentage when the minimum and maximum NAK wait times are adjusted.
5. The probability density function should increase the likelihood of sending NAKs when the packet loss ratio increases so that a larger number of NAKs are sent when the packet loss ratio is high.

The field of stochastic processes provides a rich background for selecting an appropriate probability density function, and many will suffice for the present invention. In one embodiment of the present invention, the probability density function is created such that relatively few NAKs are generated between the minimum NAK wait time and just before the maximum NAK wait time. Very close to, or at the maximum NAK wait time, however, the probability density function dramatically increases. Such a probability density function may be generated by performing the following steps:

1. Generate a pseudo random number between a specified minimum and maximum value.
2. Apply a bias curve, such as a curve of the form $Y=X^n$, in order to generate a probability density function that is dependent on the bias curve.
3. Scale the resultant output of the curve to make the probability density function relatively immune to changes in the number of systems in the network and the minimum and maximum NAK wait timer values.
4. For any values below the minimum NAK wait timer value add the minimum NAK wait timer value to the quantity to bring it above the desired minimum NAK wait timer value.
5. For any NAK wait timer values that are beyond the maximum allowable NAK wait timer value, reduce them to the maximum allowable NAK wait timer value.

The following equations mathematically describe the above steps. The first step is to generate a uniform random number, R, such that R lies between a minimum value $R_{min}$ and a maximum value, $R_{max}$. In one embodiment of the present invention, $R_{min}=0$ and $R_{max}$ is given by the equation:

$$R_{max} = \log_{10}(M) + \frac{3}{L_p}$$

Where:

M is the number of systems; and $L_p$ is the packet loss ratio.

The packet loss ratio is a measure of the percentage of packets lost. Examining the information that is available to a particular recipient, the recipient knows how many packets have been received and the recipient knows how many NAKs have been sent to request packets identified as missing. Thus, a rough measurement of the packet loss ratio may be calculated by dividing the number of NAKs sent by the number of packets received. A better estimate of the packet loss ratio may be achieved by dividing the total number of NAKs sent by a sum of the number of packets received plus the number of NAKs sent. In some embodiments it may desirable to limit the packet loss ratio to reasonable values regardless of the calculated value. For example, in one embodiment it may desirable to limit the loss ratio to a maximum of 1 and a minimum of 0.0001.

Once an appropriate uniform random number has been obtained, the next step is to apply a bias curve and scale the bias curve. A scaled time delay may thus be given by:

$$T_s = S\ R^n$$

Where:

$T_s$ is the scaled time delay,

S is a scale factor,

R is the random number obtained previously, n is the power of the curve applied.

In the above equation a bias curve of the form $Y=X^n$ is used to bias the random numbers by increasing or decreasing their value and thus modifying the uniform probability density function. Other bias curves having a different shape may also be used. By adjusting the bias curve, the particular shape of the resultant probability density function can be adjusted for a particular implementation.

In order to preserve the density of the original distribution independent of the number of systems in the network and minimum and maximum timer values, the scale factor $$S = \frac{T_{max} - R_{max}}{\log_{10}(M)}$$

S may be selected by the equation:

Where:

S is the scale factor in the equation above;

$R_{max}$ is the maximum random value calculated previously;

$T_{max}$ is the maximum timer value;

M is the number of systems.

Since we want a timer value that is greater than the minimum allowable timer value, steps must be taken to ensure that the scaled timer value, $T_s$, falls within the desired range. Thus, if $T_s$ is less than the allowable minimum timer value, the allowable minimum timer value is added to $T_s$ to bring it above the minimum. In other words:

$$T_m = \begin{cases} T_s & \text{if } T_s > T_{\min} \\ T_s + T_{\min} & \text{otherwise} \end{cases}$$

Where:

$T_m$ is the timer value which is guaranteed to be above the minimum;

$T_s$ is the scaled timer value calculated above;

$T_{min}$ is the minimum allowable timer value.

It is desirable in the above equation to add $T_{min}$ to the scaled timer value if it is less than the minimum rather than simply truncating the scaled timer value to the minimum. Truncating the scaled timer value to the minimum would result in an unacceptably high probability density function at the lower end of the timer values. Adding the minimum produces no such undesirable effects. Finally, the above calculations may have resulted in some values being above the maximum allowable timer value. These may be brought into the desirable range by simply limiting them to the maximum allowable timer value if they are greater than the maximum allowable timer value. This will increase the probability density function around the maximum allowable timer value. However, since it is desirable to bias the probability density function to larger values, this does not create a problem. Thus, the timer value selected, T, is given by:

$$T = \begin{cases} T_m & \text{if } T_m < T_{\max} \\ T_{\max} & \text{otherwise} \end{cases}$$

Where:

T is the selected timer value $T_m$ is the timer value calculated in the previous equation above; and $T_{max}$ is the maximum allowable timer value.

Returning now to FIG. 8, NAK timer 152 thus selects a NAK wait timer value when packets are missed as previously discussed and, upon expiration of the NAK wait timer value, sends NAK 154 to sending system 144 in order to request retransmission of the appropriate packet. In response to NAK 154, sending system 144 will retransmit the appropriate packet or packets as indicated by packet retransmission 156. It should be noted that NAK timer 152 may utilize a protocol stack, such as a protocol stack previously illustrated in FIG. 3 to transmit NAK 154. It is also possible for NAK timer 152 to use the principles previously described in conjunction with the statistical reliability mode of transmission to increase the likelihood that NAK 154 will arrive at sending system 144. In other words, NAK 154 may be transmitted in multiple packets using the principles previously described. In the alternative, NAK 154 may be a single packet. In this case, the statistics of the NAK timer which will cause multiple transmissions of the NAK packet from various systems if the first NAKs are not received increases the probability that at least one NAK will be received by sending system 144.

When a packet in a message is received, and the full message has not yet been received, there is always the possibility that the remainder of the message may never be received. For example, perhaps a physical problem in the network develops after only a portion of the message has been received. In such a situation the likelihood that the entire message will be received within a reasonable amount of time is virtually nonexistent. Thus, mechanisms must be put in place to delete a partially received message after a certain length of time if the remainder of the message has not been received. Thus, embodiments within the scope of this invention may comprise means for removing an incomplete message. In FIG. 8 such means is illustrated, for example, by message life timer 158. When the first packet of a message is received, a timer may be set. If the entire message has not been received before the timer expires, then message life timer 158 may delete the partially received message and recover the space occupied by it. Message life timer 158 may be responsible for communicating with receiver 148 to identify when the first packet of a new message has been received. In the alternative, message life timer 158 may examine message receive list 150 to identify new entries as they are created when a packet is first received for a new message. As yet another alternative, receiver 148 may be responsible for setting the initial value of the timer while message life timer 158 may be responsible for removing any incomplete messages whose timer has expired. The exact implementation will depend on various design choices.

The operation of the timer that determines the lifetime of the message may be operated in a variety of ways. For example, in one embodiment the timer is initially set upon receipt of the first packet of a message. Note that this first packet may not necessarily be the first sequential packet in the message. It is just the first packet that is received by a particular recipient, independent of the packet sequence number. The value on the timer may be set to a particular length of time such that if the message is not received within that particular length of time the message is deleted. In the alternative, the timer may be set to a smaller value that represents the length of time before the next packet is expected. If a packet is received within the designated period of time, then the timer value is reset. Otherwise, the message is deleted. In the first method, the timer value simple represents the maximum time given for a particular message to be received. In the second approach, as long as packets are being received, the time may be extended in hopes that a further packet will be received. In another embodiment, combinations of the two approaches may be used. In other words, as long as packets are being received, the timer may be reset, however, the total time would not be allowed to exceed some maximum value. This approach may be implemented with one or two timers. How the message life timer is managed will be dependent upon various design choices.

When a message has been completely received, receiver 148 may set a message completely received flag in the appropriate message list 150. This may be a signal to another component such as message handler 160 that the message has been completely received and should be transmitted to the appropriate application, such as application 142. Thus, in FIG. 8 message handler 160 is one example of a means for transferring a received message to the appropriate destination. In the alternative, a signal may simply be sent to the appropriate application which would then retrieve the message directly from the message buffer.

It should be noted that the protocol of the present invention provides for responses to be sent back to sending system 144. Thus, it is possible that once a message has been received by application 142, it will desire to transmit a reply back to sending system 144. Thus, each recipient may comprise mechanisms to transmit the appropriate response. Such mechanisms may utilize the structures previously described to transmit information in the statistical reliability mode or the positive reliability mode, described hereafter. In other words, a recipient may incorporate not only the structures illustrated in FIG. 8 but also the structures and processing associated with a sending system, such as that described in FIGS. 6 and 7, and as described in conjunction with the positive reliability below. At various times any system in the network may be both a sending system and receiving system, and may thus incorporate appropriate functionality to perform these roles.

Figure 9:
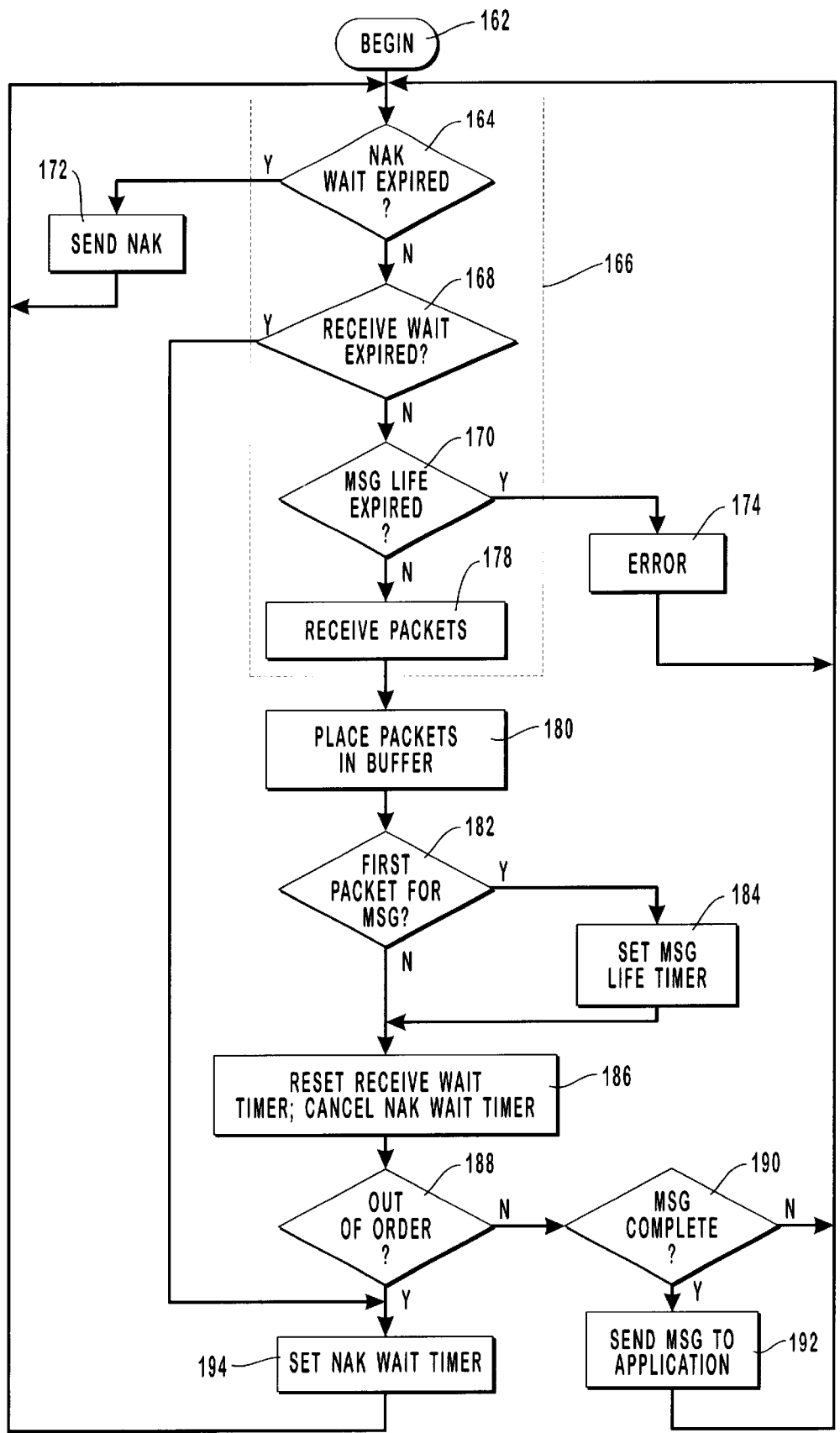
FIG. 9 is a flowchart showing the processing steps taken by each receiving system in the statistical reliability mode of the present invention.

Referring now to FIG. 9 a flowchart showing the processing steps taken by one embodiment of a receiving system in order to receive a message and give it to an application is shown. In FIG. 9, no effort has been taken to separate functions according to the elements illustrated in FIG. 8 (e.g. receiver 148, NAK timer 152, message life timer 158, and message handler 160). The emphasis, rather, is in how the functionality incorporated into the elements is performed. However, during the discussion of FIG. 9, possible allocation of the functionality will be presented.

After beginning at step 162, checks are made regarding the expiration of three relevant timers for a particular message, if they are operating. Namely, whether the NAK wait timer has expired at step 164, the receive wait timer at step 168, and the MSG life timer at step 170. As previously explained in conjunction with FIG. 8, the check on the NAK wait timer may be performed by NAK timer 152, while the checks on the receive wait timer and the MSG life timer may be performed by message life timer 158.

If the NAK wait timer has expired at step 164, then a NAK is sent for that particular packet at step 172. As previously explained, the NAK wait timer operates so as to stagger multiple NAKs for the same packet coming from different systems. This reduces network congestion and reduces the total number of NAKs. If the receive wait timer expires at step 168, this indicates that a packet is "overdue" and unexpectedly late. The NAK wait timer will be started in step 194 and if the packet isn't received by original transmission or retransmission before the expiration of the NAK wait timer a NAK will eventually be sent. The NAK wait timer value may be selected with an appropriate probability density function, as previously described. If the MSG life timer expires at step 170, then too much time has elapsed for receiving all of the packets to assemble the message thereby indicating that an error of some sort has occurred. There may some circumstances when a packet can never be delivered to the receiving system despite repeated sending of NAKs. The error indication is handled at step 174 before processing proceeds back to the top to await arrival of more packets or expiration of a timer. As previously mentioned, the error handling generally includes deleting any partially received message, but may also include such actions as sending notification of the failed reception to an appropriate error logging facility or other appropriate entity.

At step 178, the receiving system waits for packets as well as the expiration of timers (as represented by the dashed box 166). As packets are received at step 178, they are placed in a buffer, such as message receive list 150 of FIG. 8, for reassembling the actual data message at step 180. If this packet is the first received packet for a new message (regardless of packet sequence number) as determined at decision block 182, the MSG life timer is started at step 184. Reception and placing of packets into an appropriate buffer may be performed by receiver 148 of FIG. 8. The setting of MSG life timer in steps 182 and 184 may be performed either by receiver 148 or message life timer 158 of FIG. 8, depending upon the exact implementation.

Since a packet has just been received, the receive wait timer is set/reset at step 186. As explained previously, the receive wait timer allows a time interval through which packets are expected to arrive from the sending system once a message has been started. This interval may be related to the pacing algorithm so that the two cooperate to avoid excessive NAKs that might occur when network performance is already degraded to the degree that the pacing algorithm is stretching times between packets that may exceed the receive wait timer interval value. This may also be performed either by receiver 148 or message life timer 158, depending upon the implementation. If the receipt of the packet has eliminated the need to send a NAK, the appropriate NAK wait timer is also cancelled at step 186.

At decision block 188, the receiving system determines If the packet is out of sequential order. If not, a determination is made at decision block 190 whether the message is completed. If the message is not completed, processing returns to waiting on timer expirations and the arrival of more packets. Otherwise, once the message is complete as determined at decision block 190 the completed message is passed up to the application at step 192 before processing proceeds back to the top to await arrival of more packets or expiration of a timer. The test for out of order packets at decision block 188 is performed by receiver 148 while the message complete test may be performed by either or both of receiver 148 or message handler 160. For example, when the message is complete receiver 148 can set the message complete flag which signals message handler 160 to pass the message to the application.

If a packet has been "skipped" as determined at decision block 188, it may be that the packet has been lost or dropped therefore requiring a NAK to be sent. For this reason the NAK wait timer is set at step 194 for the skipped packet in a fashion previously described.

Although the embodiment in FIG. 9 uses separate receive wait timers and NAK wait timers, the effect of the two timers can be accomplished by using only NAK wait timers. This can be illustrated by examining the effect of the receive wait timers in FIG. 9. The receive wait timers add a fixed wait time to the NAK wait timer in the situation when an expected packet does not arrive. The same effect can be achieved by setting a NAK wait timer whenever a packet is received with the NAK wait timer having a minimum value equal to the desired receive wait plus the regular minimum value of the NAK wait timer. If a packet is received out of order, the NAK wait timer is still set with the regular minimum value of the NAK wait timer.

In certain situations, the reliability provided by the statistical reliability mode of the present invention is insufficient and absolute guaranteed reliability is required. In such a situation, the present invention can operate in a positive reliability mode. The positive reliability mode adds additional processing steps and functionality to the basic statistical reliability mode in order to guarantee reception by each intended recipient of the message that is capable of receiving message packets. The positive reliability mode is able to identify any intended recipients that did not receive the message so that a rebroadcast to those intended recipients may be achieved. The following discussion focuses on the positive reliability mode of the present invention. It should be noted that embodiments within the scope of this invention may switch between positive reliability mode and statistical reliability mode on a message-by-message basis by an application, or on a per-sender or per-site basis by systems management. Thus, in embodiments where it is desirable to provide both the statistical reliability mode and the positive reliability mode incorporation of the additional functionality for the positive reliability mode is needed.

Transmission in the positive reliability mode proceeds largely as previously described in conjunction with the statistical reliability mode, with some important additions.

Basically, the sending system builds a transmission list (TList) of all the intended recipients. The message to be transmitted is then broken into packets for transmission, with additional packets being added to achieve the required minimum number as previously described. In order to provide positive feedback as to the receipt of packets by particular intended recipients, a flag is set once every N packets requesting an acknowledgment of receipt of that packet. The number of packets between the packets having the acknowledgment requested flag set is referred to as the ACK window or transmission window. In this application, these two terms are used interchangeably. When packets are received by an intended recipient, if the ACK requested flag is set, an ACK is returned to the sending system. Missing packets are handled using the NAK procedure previously described. The sending system listens for both ACKs and NAKs and tracks which systems have positively acknowledged all packets having the ACK requested flag set. If the sending system finds unacknowledged packets, those packets are resent to the systems that have not returned an acknowledgment. The sending system processes received NAKs as previously described.

Figure 10:
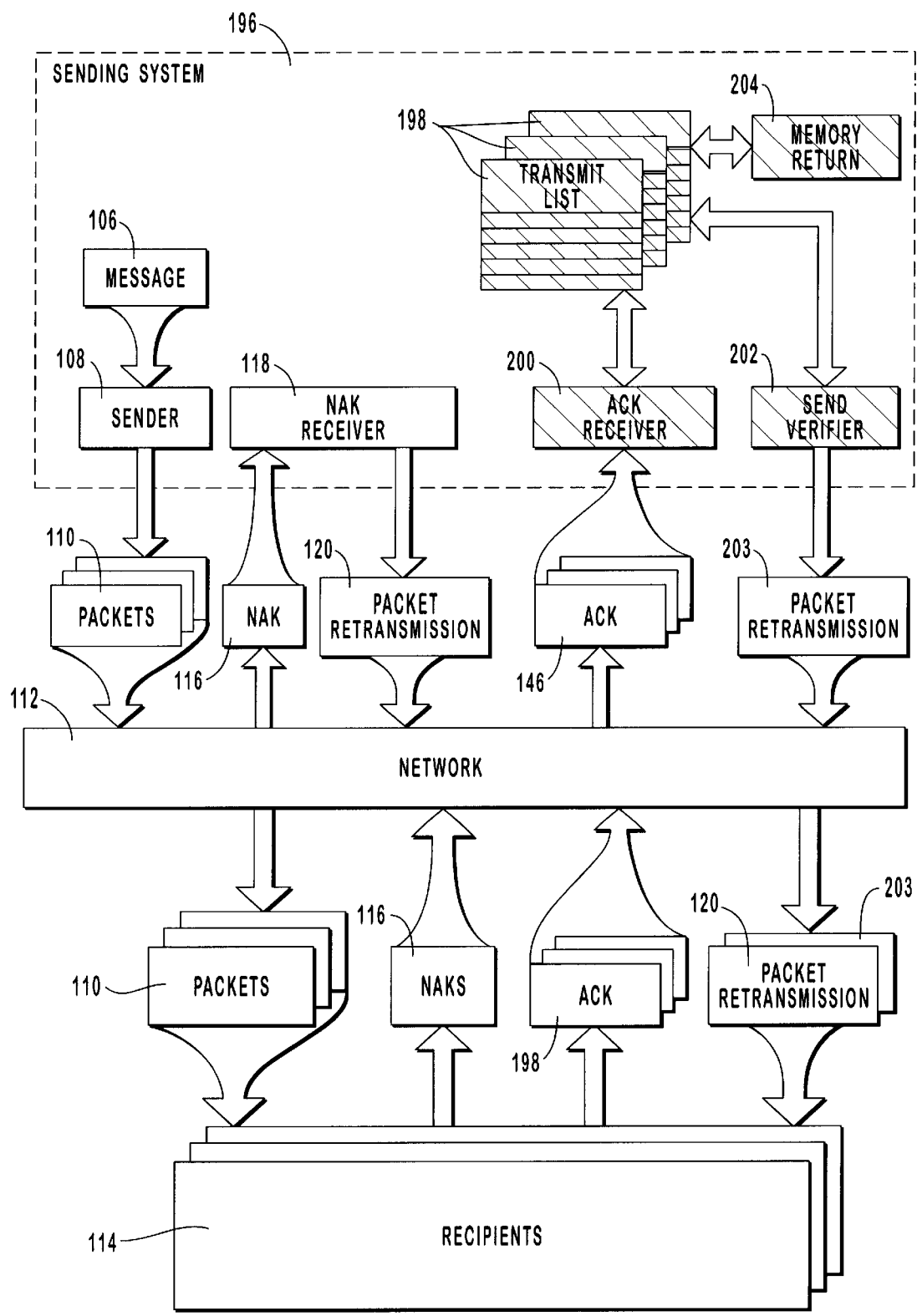
FIG. 10 illustrates a sending system operating in the positive reliability mode.

Referring now to FIG. 10, a structural diagram of an embodiment implementing positive reliability mode is presented. Note that there is a great deal of similarity between FIG. 10 and FIG. 6. Furthermore, sender 108 and NAK receiver 118 function essentially as previously described in FIG. 6. Any changes are noted below. The additional functionality added by the positive reliability mode is indicated in FIG. 10 by the shaded blocks. The functional blocks of FIG. 10 may be implemented using separate threads or any other manner.

In FIG. 10, sending system 196 comprises a plurality of functional units. Message 106, which is received from an application or other source, is broken down by sender 108 into the required number of transmission packets. As previously described, if the number of packets is less than the required minimum, then additional padding packets are added until the required minimum number is achieved. Sender 108 then transmits the packets 110 via network 112 to intended recipients 114. Sender 108 may use the pacing methodologies previously described. Recipients which receive at least one, but less than all of the packets of a message will then generate a NAK, such as NAK 116, requesting retransmission of the missed packets. NAK 116 is received by NAK receiver 118 and, in response, the appropriate packet 120 is retransmitted. All of the steps may occur as previously described.

In the positive reliability mode, the operation of sender 108 is modified somewhat to generate slightly different packets for transmission to the recipients. As previously described in conjunction with the statistical reliability mode, the packets are sequentially numbered in the packet sequence number field, starting with one. In addition, however, the ACK request flag is set on every Nth packet. As previously described in Table 3, when the ACK request flag is set in a packet the recipient generates an acknowledgment or ACK and transmits the ACK back to the sending system. The number of packets between packets with the ACK request flag set is referred to as the transmission window or ACK window. This lets sending system 196 know with certainty that all of the packets of the ACK window were received. Furthermore, when positive reliability mode is used the last packet of the message has the ACK request flag set.

Prior to transmission a transmit list or TList is created that includes the intended recipients for the message. In FIG. 10 this is illustrated by transmission list 198. Transmission list 198 is an example of a means for tracking receipt of messages by intended recipients. In one embodiment, a transmission list is created for each message that is sent in positive reliability mode. In one embodiment, the transmission list comprises the message number, a pointer to the beginning of the message buffer, and for each recipient, the recipient's UDP address, a transmit list reply bit, a transmit window bitmap, and a time stamp of the latest ACK or NAK received. As with other addresses disclosed herein, the UDP address of each recipient may comprise an IP address and a UDP port number. The transmit list reply bit is set to true when the message is of a type where reply is requested and the reply has been completely received. The transmit window bitmap contains an ACK bit and an ACK/NAK time stamp for each transmit window in the message. Transmit list 198 may be created by sender 108 or may be created by other components in the system.

When recipients 114 receive a packet with the ACK request flag set, recipients 114 generate ACK 198 and send it to sending system 196. Embodiments within the scope of this invention may, therefore, comprise means for receiving acknowledgments. By way of example, and not limitation, such a means is illustrated by ACK receiver 200. ACK receiver 200 receives ACK 198 and updates transmit list 198 according to the received ACKs. In other words, when an ACK is received, ACK receiver 200 will update the transmit window bitmap by setting the appropriate ACK bit and ACK/NAK time stamp. Furthermore, ACK receiver 200 will update the field which tracks the time stamp of the latest ACK or NAK. ACK receiver 200 is also, therefore, an example of means for updating the transmission list.

The purpose of tracking received ACKs is to identify intended recipients that did not receive the acknowledgment request packet. Periodically, transmission list 198 may be checked and intended recipients which have not acknowledged appropriate packets identified. The appropriate packets can then be rebroadcast to the intended recipients. Embodiments within the scope of this invention may, therefore, comprise means for identifying recipients which have not acknowledged receipt of packets and means for retransmitting the packets. By way of example, and not limitation, in FIG. 10 both such means is illustrated by send verifier 202. Send verifier 202 scans transmission list 198 for entries in the transmit window bitmaps which have an ACK/NAK time stamp of zero. When a non-acknowledged transmit window is discovered, the ACK requested packet of the transmit window (the last packet in the window) is transmitted to the UDP address of the intended recipient.

Different policies on how often send verifier 202 scans transmission list 198 may be established. For example, in one embodiment send verifier 202 begins scanning transmission list 198 after a sufficient time has elapsed that an ACK is expected to be returned. This time delay is generally set based on the expected propagation delay in the network, the time that it takes to process received packets at the receiving system and the propagation delay for the ACK back to the sending system. In addition, since the ACK request flag is only set once each transmit window, it may be desirable to add at least one transmit window's worth of delay onto the expected value. Furthermore, it may be desirable to account for the current pacing output since it influences the transmission rate of the packets. Once send verifier thread scans transmission list 198, it should periodically rescan the list. In one embodiment transmission list 198 is scanned with the frequency of one-half times the expected ACK delay time.

Since the information in transmission list 198 is only required until receipt of message is assured, embodiments within the scope of this invention may comprise means for freeing memory no longer needed by transmission list 198. In FIG. 10, such means is illustrated, by way of example, by memory return 204. When a transmit window has been completely acknowledged by all recipients, the memory used for both that portion of the message buffer and the entry in the transmit list for that transmit window can be freed. In other words, when the corresponding ACK bits are set in the transmit window bitmap for all IP addresses that are identified to receive the message, the memory containing the transmit window may be freed and the pointer to the message buffer may be adjusted. Once the message has been completely received by all intended recipients, the transmit list may also be discarded. Various embodiments of the present invention may utilize different policies for initiating scans by memory return 204. In one embodiment memory return 204 runs on the same schedule as send verifier 202. In other embodiments different schedules may be utilized.

Figures 11A, 11B:
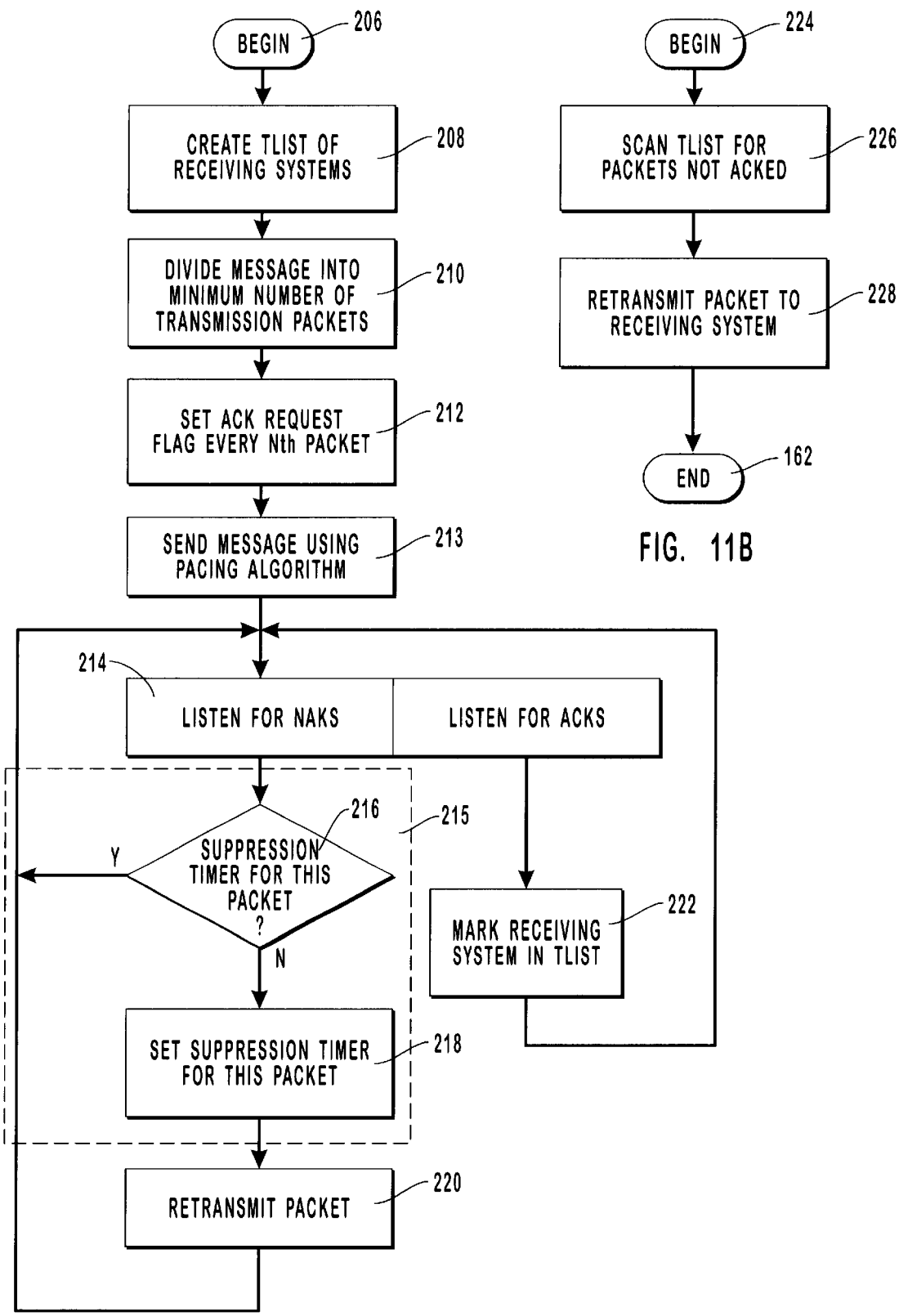
FIGS. 11A and 11B are flowcharts showing the processing steps taken by the sending system in the positive reliability mode of the present invention.

Referring now to FIGS. 11A and 11B, a flowchart representing the processing steps taken by the sending system according to the present invention in order to send a message to a receiving system is shown. After beginning at step 206 of FIG. 11A, the sending system will create a transmit list or TList at step 208 so that the ACK status for all receiving systems may be tracked. As previously described, one tracking list is created for each transmitted message. The tracking list may include such information as the message number, a pointer to the message buffer, and for each recipient, the recipient's UDP address, a transmit list reply bit, a transmit window bitmap, and the time stamp of the latest ACK or NAK received.

At step 210, the message is divided into the requisite minimum number of transmission packets for desired reliability. This proceeds as previously explained, with extra packets added to arrive at the minimum number of packets if required. These padding packets, which may not carry necessary data, are used to determine completeness of the message at the receiving system. The last packet will have the Last Packet flag set, and each packet will have a unique sequential packet number.

With the packets created, the sending system will set the ACK Request flag for every $N^{th}$ packet. The N interval of packets is chosen based on desired positive reliability with smaller numbers creating greater network traffic but providing higher levels of reliability. Thus, if the ACK request flag is set every $N^{th}$ packet a transmit window is N packets long.

The message is sent by sending each packet onto the IP network using the UDP multicast facility at step 213 to the designated receiving systems. The packets will not be sent out all together or as rapidly as possible in the illustrative embodiment. They may be sent out according to a pacing algorithm, such as that previously described. As explained previously, the pacing algorithm reduces network overhead since it is responsive to general network packet error trends and sends packets out at greater intervals when the network is performing at a lower level. Steps 208, 210, 212, and 213 can be performed by sender 108 of FIG. 10.

At step 214, the sending system will wait for NAKs from the receiving systems so that it can retransmit any missed packets as well as the ACKs from each receiving system for each $N^{th}$ packet received. Listening for NAKs and retransmitting any required packets may be performed by NAK receiver 118, while listening for ACKs may be performed by ACK receiver 200. In order to reduce the amount of network traffic caused by retransmission, embodiments within the scope of this invention may comprise means for suppressing packet retransmission. By way of example, and not limitation, in FIG. 11A such means is represented by retransmission suppressor 215. Retransmission suppressor 215 reduces duplicate retransmission of the same packet when two NAKs for the same packet are received within a designated time period. At decision block 216, a test is made to see if there is a suppression timer running for this packet. If so, the NAK is ignored since a retransmission has already occurred and that particular receiving system may already or may shortly have the missing packet. This prevents extra retransmissions of the same packet that will tend to degradate network performance.

If the suppression timer is not running as determined at decision block 216, one is started for this packet at step 218 and the packet is retransmitted, again using UDP multicast, at step 220. Multicast is used so that all receiving systems that may have missed the packet previously will have an opportunity to receive it. As previously described, in conjunction with NAK suppressor 130 of FIG. 7, NAK suppressor 215 may work in conjunction with receiving system processing that reduces the actual number of NAKs generated. Decision block 216, step 218, and step 220 may be implemented by NAK receiver 215 of FIG. 10.

If an ACK is received at step 214, the sending system will mark the corresponding receiving system in the TList at step 222 as having positively received the corresponding packet. This is the TList update processing that is performed by ACK receiver 200 of FIG. 10 previously explained. Periodically, as shown in FIG. 11B, the sending system will scan the TList in order to determine receiving systems that should have ACKed receipt of particular packets. This is illustrated by step 226. For those who have not appropriately ACKed receipt, the sending system will retransmit the appropriate packets at step 228. Steps 226 and 228 can be implemented in send verifier 202 of FIG. 10.

Figure 12:
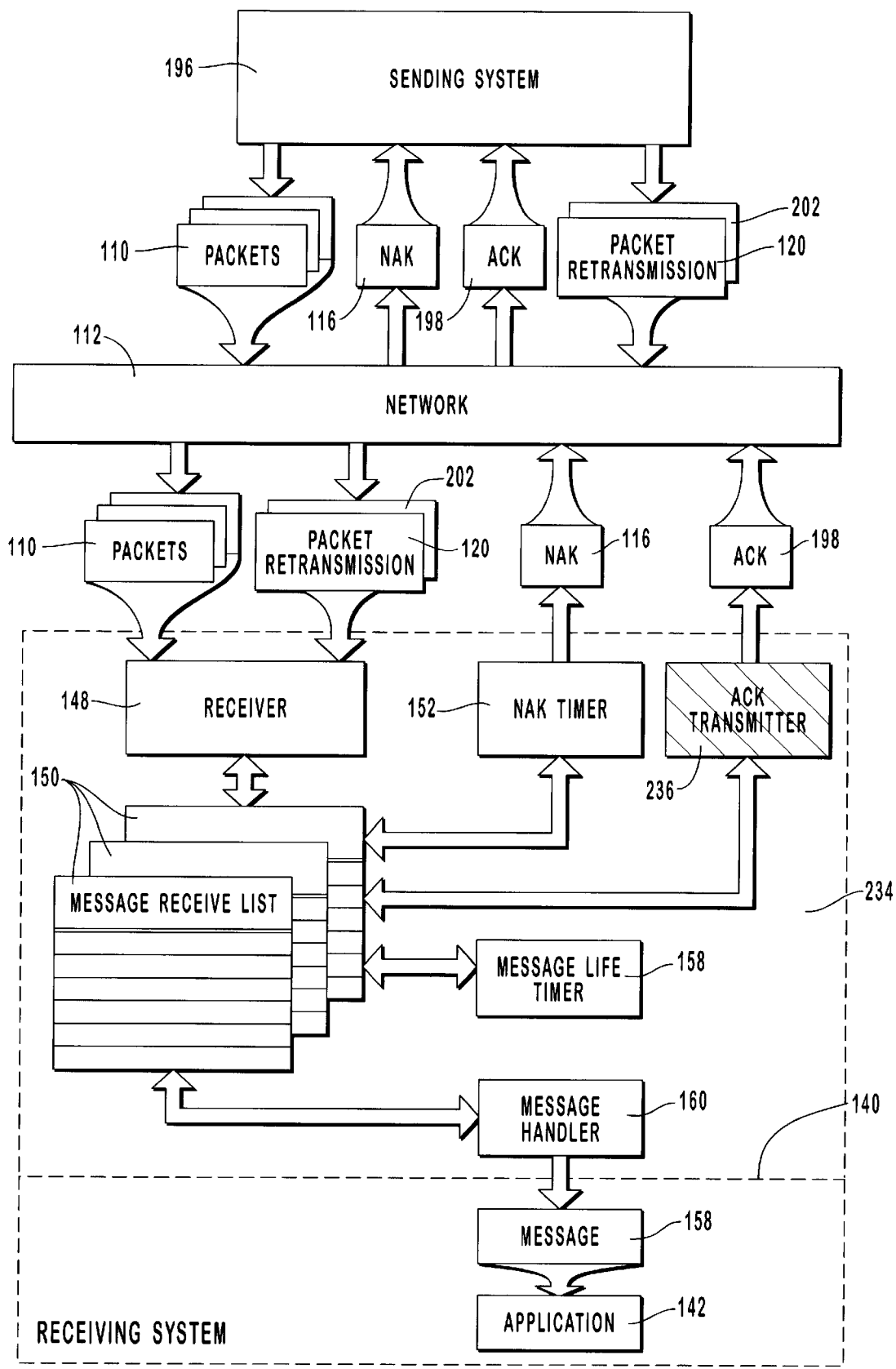
FIG. 12 illustrates a receiving system operating in the positive reliability mode.
Figure 13:
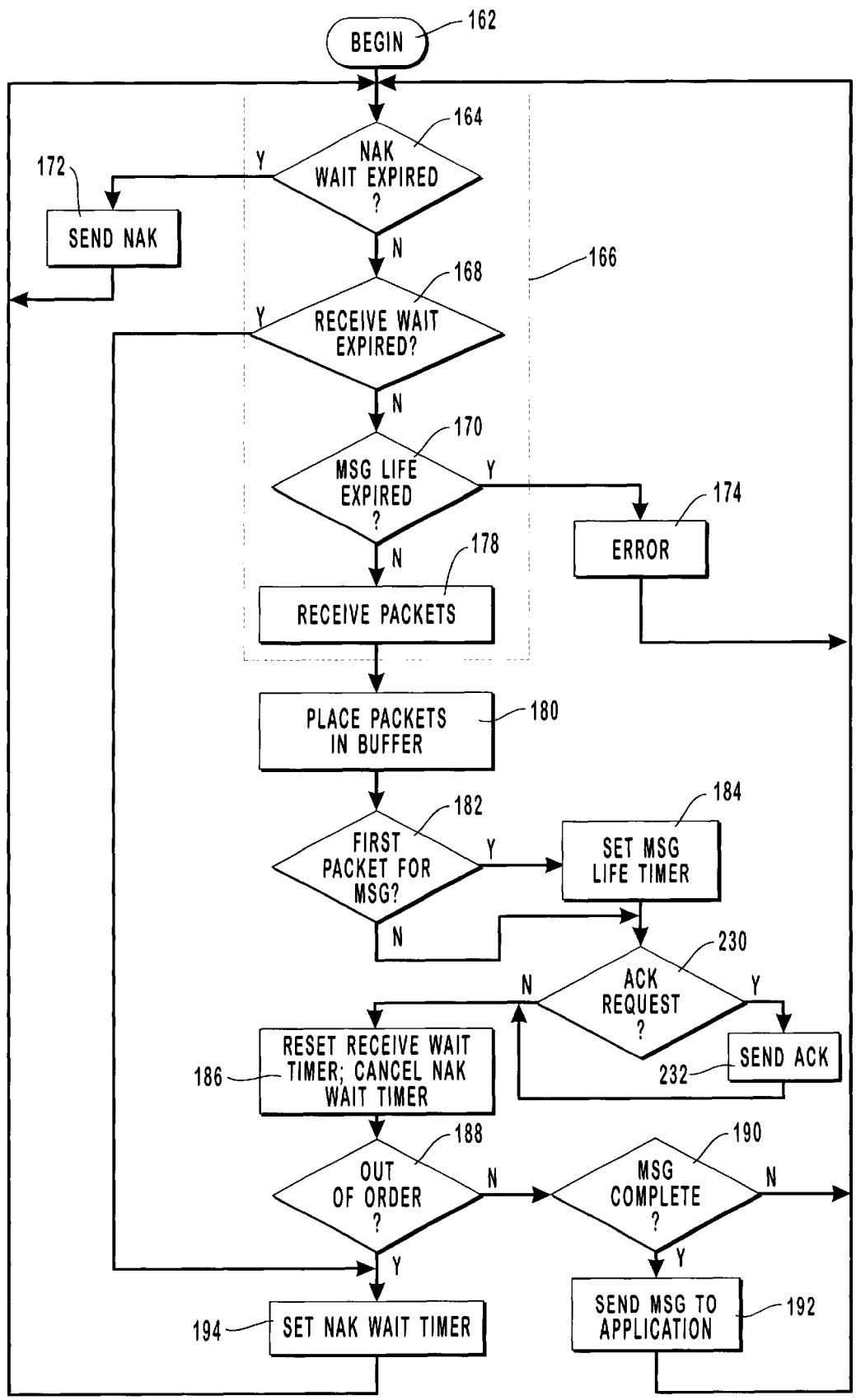
FIG. 13 is a flowchart showing the processing steps taken by each receiving system in the positive reliability mode of the present invention.

Referring now to FIG. 12, the details of a receiving system suitable for use when the positive reliability protocol is used is presented. In FIG. 12, sending system 196 is presumed to operate according to the positive reliability protocol previously described. The new functionality required in a receiving system when operating according to the positive reliability protocol is illustrated in FIG. 12 by the shaded portions. As indicated in FIG. 12, the only new functionality that is added to receiving system 234 is ACK transmitter 236. When a packet is received that has the ACK request flag set, a receiving system responds with an ACK for that packet. Thus, embodiments within the scope of this invention may provide means for transmitting an acknowledgment. In FIG. 12 such means is illustrated, for example, by ACK transmitter 236. ACK transmitter 236 is responsible for ensuring that an ACK is transmitted whenever a packet with the ACK request flag set is received. In the embodiment illustrated in FIG. 12, ACK transmitter 236 may receive notification from receiver 148 that a packet with the ACK request flag set has been received or ACK transmitter 236 may periodically scan message receive lists 150 in order to identify appropriate packets. Other than this difference, receiving system 234 operates as previously described in conjunction with FIG. 8. This is highlighted in FIG. 13 which contains a flow diagram similar to that presented in FIG. 9 which illustrates that the various processing steps for receiving system 234. Note that the only difference between FIG. 13 and FIG. 9 is decision block 230 and step 232 which detects whether the ACK request flag is set for a particular packet and, if so, sends an appropriate acknowledgment. The remainder of FIG. 13 is identical to FIG. 9 and the steps have been numbered accordingly. The remainder of these steps will not, therefore, be repeated at this point.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a network comprising a sending system networked together with at least one receiving system, a method for efficiently and reliably transmitting a data message from the sending system to the at least one receiving system in a manner that minimizes network traffic while maintaining high reliability, the method comprising the steps of:

dividing the message to be sent into a plurality of data blocks and placing each data block into a sequentially identified transmission packet, and if the total number of transmission packets is less than a defined minimum number, then creating additional sequentially identified transmission packets until said defined minimum number are available;

transmitting said sequentially identified transmission packets from the sending system to the at last one receiving system; and at each receiving system which receives at least one of said sequentially identified transmission packets, determining if a transmission packet making up the message has not been received, and in response to the determination, sending a negative acknowledgment to the sending system identifying the unreceived packet so that the unreceived packet may be re-transmitted.

2. A method as recited in claim 1 further comprising the steps of:

said sending system setting an acknowledgement flag every $N^{th}$ transmission packet;

when a receiving system receives a packet with an acknowledgement flag set, said receiving system sending an acknowledgement back to said sending system;

said sending system tracking received acknowledgements to identify receiving systems that should have received transmission packets with the acknowledgement flag set, but which have not sent an acknowledgement to the transmitted packets; and said sending system resending transmission packets which should have been acknowledged but which remain unacknowledged.

3. A method as recited in claim 1 wherein the transmission packets are sent using a pacing method that sends the transmission packets at a given transmission rate so that the transmission of the packets has little or no effect on the packet loss rate of the network.

4. A method as recited in claim 1 further comprising the step of identifying, by the sending system in response to a negative acknowledgment received from a receiving system, whether the unreceived packet has already been retransmitted within a designated time period and if so, then ignoring said negative acknowledgment, otherwise retransmitting the unreceived packet.

5. A method as recited in claim 1 further comprising the steps of:

setting a negative acknowledgement wait timer value at each receiving system which determines that a transmission packet making up the message has not been received, said timer value being selected between a minimum negative acknowledgement wait time and a maximum negative acknowledgement wait time according to a given probability density function; and upon expiration of the negative acknowledgement wait timer value, if the missing transmission packet has not been received, then transmitting a negative acknowledgement to the sending system.

6. A method as recited in claim 1 further comprising each receiving system starting a receive message timer after each packet is received with the expectation that another packet will arrive before said receive message timer expires.

7. A method as recited in claim 1 wherein the sending system sends the transmission packets multicast out to the receiving systems within a group and each receiving system sends any applicable communication unicast back to the sending system.

8. A method as recited in claim 1 wherein each transmission packet further contains a reply request flag that, when set, indicates that each receiving system will send a reply message back to the sending system.

9. In a network comprising a sending system networked together with at least one receiving system, a method for efficiently and reliably transmitting a data message from the sending system to the at least one receiving system in a manner that minimizes network traffic while maintaining high reliability, the method comprising the steps of:

dividing the message to be sent into a plurality of data blocks each of which is carried by a sequentially identified transmission packet, and if the total number of transmission packets is less than a defined minimum number, then creating additional sequentially identified transmission packets until said defined minimum number are available;

transmitting said sequentially identified transmission packets from the sending system to the receiving systems;

waiting for a negative acknowledgment to be received from the at least one receiving system requesting retransmission of at least one transmission packet; and upon receipt of said negative acknowledgement, determining if the requested at least one transmission packet has been transmitted within a designated period of time, and if so, then ignoring said negative acknowledgment, otherwise retransmitting the requested at least one transmission packet.

10. A method for transmitting a data message as recited in claim 9 further comprising the step of sending the packets using a pacing method that sends the transmission packets at a given transmission rate so that the transmission of the packets has little or no effect on the packet loss rate of the network.

11. A method for transmitting a data message as recited in claim 10 further comprising the step of setting an acknowledgment flag every $N^{th}$ transmission packet.

12. A method for transmitting a data message as recited in claim 11 further comprising the step of creating a transmission list comprising the intended receiving systems that are to receive the message and a transmit window bitmap that is adapted to record receipt of acknowledgements received from each of the intended receiving systems for each transmission packet having an acknowledgment flag set.

13. A method for transmitting a data message as recited in claim 12 further comprising the steps of waiting for an acknowledgment to be returned from a receiving system; and recording receipt of the acknowledgment in said transmit window bitmap.

14. A method for transmitting a data message as recited in claim 13 further comprising the steps of:
   periodically scanning said transmit window bitmap to identify intended receiving systems that have not returned acknowledgements; and
   retransmitting to the identified receiving systems any unacknowledged transmission packets.

15. In a network comprising a sending system networked together with at least one receiving system, a method for efficiently and reliably transmitting a data message, comprising a plurality of sequentially identified transmission packets, from the sending system to the at least one receiving system in a manner that minimizes network traffic while maintaining high reliability, the method comprising the steps of:
   waiting, at a receiving system, for a triggering event comprising at least one of either receipt of a transmission packet or expiration of a negative acknowledgment wait timer;
   upon the triggering event of receipt of a transmission packet, performing at least the steps of:
      placing the received transmission packet in a buffer;
      if the received transmission packet is the first transmission packet received for a given message, then setting at least one timer, the expiration of which will lead to the triggering event of expiration of a negative acknowledgment wait timer for the message;
      if the received transmission packet has been received out of sequence order, then 1) selecting a negative acknowledgment wait time according to a defined probability density function that results in relatively few shorter wait times and relatively many longer wait times, and 2) setting a negative acknowledgment wait timer for the message associated with the transmission packet using the selected negative acknowledgment wait time;
   upon the triggering event of expiration of a negative acknowledgment wait timer, then performing at least the steps of:
      sending a negative acknowledgment to the sender system.

16. A method for transmitting a data message as recited in claim 15 wherein upon the triggering event of receipt of a transmission packet further performing the step of determining if the received packet has an acknowledgment flag set, and if so, then transmitting an acknowledgment to the sender system.

17. A method for transmitting a data message as recited in claim 15 further comprising the steps of:
   said sending system dividing the message to be sent into a plurality of data blocks each of which is carried by a sequentially identified transmission packet, and if the total number of transmission packets is less than a defined minimum number, then creating additional sequentially identified transmission packets until said defined minimum number are available;
   send sending system transmitting said sequentially identified transmission packets from the sending system to the receiving systems;
   said sending system waiting for a negative acknowledgment to be received from the receiving systems requesting retransmission of at least one transmission packet; and
   upon receipt of said negative acknowledgement, said sending system determining if the requested at least one transmission packet has been transmitted within a designated period of time, and if so, then ignoring said negative acknowledgment, otherwise retransmitting the requested at least one transmission packet.

18. A computer readable medium having computer executable instructions carried thereon for use in a network comprising a sending system networked together with at least one receiving system, where messages are sent from said sending system to at least one receiving system using transmission packets designed to carry a designated quantity of data among a plurality of systems connected together in a network configuration, the computer executable instructions comprising:
   means for dividing a message into a plurality of individual transmission packets and for adding additional transmission packets if the message fills less than a minimum number of individual transmission packets;
   means for sending the message comprised of a guaranteed minimum number of individual transmission packets;
   means for receiving requests for packet retransmission and for retransmitting the requested packets; and
   means for suppressing packet retransmission if a request for retransmission is received within a designated time after a given packet has been transmitted.

19. A computer readable medium as recited in claim 18 further comprising means for receiving acknowledgments from the receiving systems.

20. A computer readable medium as recited in claim 18 further comprising means for tracking receipt of messages by intended recipient so that receipt of individual packets by a given intended recipient can be confirmed.

21. A computer readable medium as recited in claim 18 further comprising means for identifying recipients which have not acknowledged receipt of packets.

22. A computer readable medium as recited in claim 18 further comprising means for retransmitting packets that have already been sent.

23. A computer readable medium as recited in claim 18 further comprising means for pacing transmission of packets so that the transmission of packets has little or no effect on the packet loss rate of the network.

24. A computer readable medium having computer executable instructions carried thereon for use in a network comprising a sending system networked together with a plurality of receiving systems, where messages are sent from said sending system to at least one receiving system using transmission packets designed to carry a designated quantity of data among a plurality of systems connected together in a network configuration, the computer executable instructions comprising:
   means for receiving individual packets of a message comprised of a guaranteed minimum number of individual transmission packets;
   means for storing received packets until the complete message can be reassembled in the proper order or until it is determined that the complete message will not be received;
   means for transmitting a request for packet retransmission if a packet in the message has not been received; and
   means for suppressing requests for retransmission of packets so that requests for retransmission from a plurality of receiving systems are not sent at the same time, said means for suppressing requests comprising means for selecting a wait time according to a defined probability density function.

25. A computer readable medium as recited in claim 24 further comprising means for removing an incomplete message when it is determined that the message will not likely be received in its entirety.

26. A computer readable medium as recited in claim 24 wherein the defined probability density function is constructed so that relatively few systems select shorter wait times and relatively more systems select longer wait times.

27. A computer readable medium as recited in claim 24 further comprising means for transferring a completely received message to the appropriate destination.

28. A computer readable medium as recited in claim 24 further comprising means for transmitting an acknowledgement when a packet is received that has an acknowledgment request flag set.

29. A computer readable medium having computer executable instructions carried thereon for use in a network comprising a sending system networked together with a plurality of receiving systems, where messages are sent from said sending system to at least one receiving system using transmission packets designed to carry a designated quantity of data among a plurality of systems connected together in a network configuration, the computer readable medium comprising:

a first computer readable medium having computer executable instructions for use in the sending system, said computer executable instructions comprising:
      a sender comprising 1) a software component adapted to divide a message into a plurality of individual transmission packets and to add additional transmission packets if the message fills less than a minimum number of individual transmission packets and 2) at least one other software component adapted to transmit the individual transmission packets on the network;
      a NAK receiver adapted to receive NAKs and further adapted to retransmit the packets requested in the NAKs; and
      a retransmission suppressor adapted to check a timer associated with a previously retransmitted packet when a NAK for the previously retransmitted packet is received and if the timer has not yet expired, then ignoring the NAK;

a second computer readable medium having computer executable instructions for use in at least one of the receiving systems, said computer executable instructions comprising:
      a receiver adapted to receive individual packets of the message and to place them in a message receive list for the message;
      said message receive list comprising a buffer to store individual packets of the message until the complete message can be reassembled in the proper order or until it is determined that the complete message will not be received;
      a transmitter adapted to transmit a NAK requesting retransmission of at least one missed packet in the message; and
      a NAK suppressor comprising a NAK wait timer and a wait time selector adapted to select a NAK wait time for the timer according to a defined probability density function.

* * * * *

UNITED STATES PATENT AND TRADEMARK OFFICE
CERTIFICATE OF CORRECTION

PATENT NO. : 6,392,993 B1
DATED : May 21, 2002
INVENTOR(S) : Keith S. Hamilton and Robert Steven Meizlik It is certified that error appears in the above-identified patent and that said Letters Patent is hereby corrected as shown below:

Column 25,
Line 41, after "There may" please insert -- be --

Column 33,
Line 59, before "sending system" delete "send" and insert -- said --

Signed and Sealed this

Eighteenth Day of February, 2003

JAMES E. ROGAN
*Director of the United States Patent and Trademark Office*